(12) United States Patent
Sato

(10) Patent No.: US 8,520,251 B2
(45) Date of Patent: Aug. 27, 2013

(54) INFORMATION PROCESSING APPARATUS, INFORMATION PROCESSING METHOD, AND COMPUTER PROGRAM

(75) Inventor: Junko Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 12/032,188

(22) Filed: Feb. 15, 2008

(65) Prior Publication Data

US 2008/0266596 A1     Oct. 30, 2008

(30) Foreign Application Priority Data

Apr. 27, 2007   (JP) ................................ 2007-119029

(51) Int. Cl.
*G06F 3/12*     (2006.01)
*G06K 15/00*   (2006.01)
*H04N 17/00*   (2006.01)

(52) U.S. Cl.
USPC ....... 358/1.18; 358/1.13; 358/1.15; 358/1.16; 715/204; 715/222; 715/223; 715/224; 715/225; 715/255

(58) Field of Classification Search
None
See application file for complete search history.

(56) References Cited

U.S. PATENT DOCUMENTS

| 7,317,551 | B2 | 1/2008 | Masaki |
| 2003/0070146 | A1* | 4/2003 | Sato et al. ..................... 715/525 |
| 2003/0164980 | A1 | 9/2003 | Masaki |
| 2004/0184103 | A1 | 9/2004 | Kremer et al. |
| 2004/0263869 | A1* | 12/2004 | Kimura ......................... 358/1.1 |
| 2006/0045596 | A1 | 3/2006 | Tischler |
| 2006/0127150 | A1* | 6/2006 | Kimura ......................... 399/405 |

FOREIGN PATENT DOCUMENTS

| CN | 1438121 A | 8/2003 |
| EP | 875840 | 11/1998 |
| EP | 1335319 | 8/2003 |
| EP | 1335319 A2 | 8/2003 |
| JP | 2002-316454 A | 10/2002 |
| JP | 2003-300354 A | 10/2003 |
| JP | 2004-199359 A | 7/2004 |
| JP | 2006-168037 A | 6/2006 |
| JP | 2006-309790 A | 11/2006 |

* cited by examiner

*Primary Examiner* — Benny Q Tieu
*Assistant Examiner* — Haris Sabah
(74) *Attorney, Agent, or Firm* — Canon USA, Inc., I.P. Division

(57) ABSTRACT

An information processing apparatus generates print data interpretable by a printing apparatus and transmits the generated print data to the printing apparatus. The information processing apparatus includes a setting unit configured to set information identifying a positional relationship between a tab portion of a first tab sheet and a tab portion of a second tab sheet in a state where the first and second tab sheets are stacked, if usage of the tab sheets is designated, wherein the tab sheet is a tab-attached printing paper to be inserted between printing papers based on print data of document information. The information processing apparatus includes a determination unit configured to determine a print start position of a character string to be printed on the tab portion of the first tab sheet and the tab portion of the second tab sheet according to the information identifying the positional relationship set by the setting unit.

6 Claims, 47 Drawing Sheets

FIG.4

| NO | ATTRIBUTE INFORMATION | | APPLICATION |
|---|---|---|---|
| 1 | PRINT METHOD | ONE-SIDED/ TWO-SIDED/ BOOKBINDING PRINT | |
| 2 | PAPER SIZE | ORIGINAL SIZE/ FIXED SIZE | · DESIGNATE Z-FOLDING WHEN "A4+A3", "B4+B3", OR "LETTER+LEDGER (11×17)" IS DESIGNATED<br>· "AUTOMATICALLY SELECT ORIGINAL SIZE OF CHAPTER 1/PAGE 1 WHEN BOOKBINDING PRINT OR N-UP PRINT IS DESIGNATED |
| 3 | PAPER ORIENTATION | PORTRAIT/ LANDSCAPE | · SELECTABLE ONLY FOR FIXED SIZE |
| 4 | BINDING MARGIN/ BINDING DIRECTION | | · SHIFT/ENLARGE-REDUCE DESIGNATION IS FEASIBLE |
| 5 | N-UP PRINT | PAGE NUMBER/ PLACEMENT ORDER/ BORDER LINE/ PLACEMENT POSITION | · 9 PATTERNS ARE AVAILABLE IN PLACEMENT POSITION<br>· DIRECT PRINT DESIGNATION IS FEASIBLE |
| 6 | ENLARGE/ REDUCE | ON/OFF | · AUTOMATICALLY DESIGNATE ON OR OFF WHEN FIXED SIZE OR N-UP PRINT IS SELECTED |
| 7 | WATERMARK | | · CAN BE INDEPENDENTLY DESIGNATED FOR EACH LOGICAL PAGE AND PHYSICAL PAGE<br>· APPLICABLE TO ALL CHAPTERS/ALL PAGES |
| 8 | HEADER/ FOOTER | | · CAN BE INDEPENDENTLY DESIGNATED FOR EACH LOGICAL PAGE AND PHYSICAL PAGE<br>· APPLICABLE TO ALL CHAPTERS/ALL PAGES |
| 9 | PAPER DISCHARGE METHOD | STAPLE/ PUNCH HOLE | · STAPLE/PUNCH IS AVAILABLE FOR ONE-SIDED/TWO-SIDED PRINTING ONLY<br>· STAPLE IS 1 PORTION OR 2 PORTIONS |
| 10 | DETAILS OF BOOKBINDING | OPENING DIRECTION/ SADDLE STITCH/ ENLARGE-REDUCE DESIGNATION/ BINDING MARGIN/ SEPARATE VOLUME | · ONLY AVAILABLE FOR BOOKBINDING PRINT |
| 11 | FRONT COVER/ BACK COVER | | · DESIGNATE PRINTING OF FRONT COVER 1/2 AND BACK COVER 1/2<br>· DESIGNATE PAPER FEED PORT (INCLUDING INSERTER) |
| 12 | INDEX SHEET | | · CHARACTER STRING PRINTING TO INDEX PORTION AND ANNOTATION ON INDEX SHEET ARE SETTABLE<br>· CANNOT BE DESIGNATED FOR BOOKBINDING PRINT |
| 13 | INTERLEAF | | · DESIGNATE PAPER FEED PORT (INCLUDING INSERTER)<br>· ORIGINAL DATA CAN BE PRINTED ON INSERTED SHEET<br>· CANNOT BE DESIGNATED FOR BOOKBINDING PRINT |
| 14 | CHAPTER BREAK | "NO BREAK"/ "PAGE BREAK"/ "PAPER BREAK" | · FIXED TO "PAPER BREAK" WHEN INDEX SHEET OR INTERLEAF IS DESIGNATED<br>· FIXED TO "PAPER BREAK" FOR ONE-SIDED PRINTING |

FIG.5

| NO | ATTRIBUTE INFORMATION | | APPLICATION |
|---|---|---|---|
| 1 | PAPER SIZE | ORIGINAL SIZE/ FIXED SIZE | · AUTOMATICALLY DESIGNATE "PAPER BREAK" WHEN FIXED SIZE IS SELECTED<br>· CHANGEABLE FOR ONLY DESIGNATED PAPER WHEN PLURAL TYPES OF PAPER ARE SELECTED IN BOOK, AND CHANGE OF PAPER SIZE IS FEASIBLE FOR DESIGNATION OF BOOK ADJUSTMENT |
| 2 | PAPER ORIENTATION | PORTRAIT/ LANDSCAPE | · SELECTABLE ONLY FOR FIXED SIZE |
| 3 | N-UP PRINT DESIGNATION | PAGE NUMBER/ PLACEMENT ORDER/ BORDER LINE/ PLACEMENT POSITION | · 9 PATTERNS ARE AVAILABLE IN PLACEMENT POSITION<br>· DIRECT PRINT DESIGNATION IS FEASIBLE |
| 4 | ENLARGE/ REDUCE | ON/OFF | · AUTOMATICALLY DESIGNATE ON OR OFF WHEN FIXED SIZE OR N-UP PRINT IS SELECTED |
| 5 | WATERMARK | DISPLAY/ NON-DISPLAY | · DETERMINE WHETHER ALL WATERMARKS DESIGNATED BY BOOK ARE DISPLAYED |
| 6 | HEADER/ FOOTER | DISPLAY/ NON-DISPLAY | · DETERMINE WHETHER ALL HEADERS/FOOTERS DESIGNATED BY BOOK ARE DISPLAYED |
| 7 | PAPER DISCHARGE METHOD | STAPLE | · "OFF" IS SELECTABLE WHEN STAPLE IS DESIGNATED BY BOOK.<br>DEFAULT SETTING IS "ON" |

FIG.6

| NO | ATTRIBUTE INFORMATION | | APPLICATION |
|---|---|---|---|
| 1 | PAGE ROTATION DESIGNATION | | · SELECTABLE FROM 0/90/180/270 DEGREES |
| 2 | WATERMARK | DISPLAY/ NON-DISPLAY | · DETERMINE WHETHER ALL WATERMARKS DESIGNATED BY BOOK ARE DISPLAYED |
| 3 | HEADER/ FOOTER | DISPLAY/ NON-DISPLAY | · DETERMINE WHETHER ALL HEADERS/FOOTERS DESIGNATED BY BOOK ARE DISPLAYED |
| 4 | ZOOM | 50% - 200% | · DESIGNATE RELATIVE MAGNIFICATION WHEN 100% SIZE IS EQUAL TO VIRTUAL LOGICAL PAGE REGION |
| 5 | PLACEMENT DESIGNATION | | · SELECT ONE OF NINE FIXED PATTERNS OR ARBITRARY POSITION |
| 6 | ANNOTATION | | |
| 7 | VARIABLE ITEM | | |
| 8 | PAGE DIVISION | | |

INFORMATION PROCESSING APPARATUS, INFORMATION PROCESSING METHOD, AND COMPUTER PROGRAM

BACKGROUND OF THE INVENTION

1. Field of the Invention

The present invention relates to an information processing apparatus capable of performing print settings, for example, for document data generated by a document processing program, and also relates to a method for controlling the information processing apparatus.

2. Description of the Related Art

An environment which enables computer users to perform any Desktop Publishing (DTP) is desired. For example, a user may want to insert a tab sheet (i.e., an index sheet with a tab portion) between pages of a document file.

In general, a user generates document information including print data generated by an application program, inserts an index sheet between printing papers while the printing of the print data of the document information is in progress, and prints a designated character string on its tab portion.

For example, a bookbinding application discussed in Japanese Patent Application Laid-Open No. 2006-309790 can insert an index sheet between printing papers and print a character string on a tab portion of the index sheet according to a designated format if a user sets the format of the character string. However, the bookbinding application discussed in Japanese Patent Application Laid-Open No. 2006-309790 performs print processing on an index sheet having a specific shape and is therefore not applicable to a print of an index sheet having a different tab portion.

For example, index sheets have tabs regularly aligned without any clearance therebetween and each tab has a size (height) equivalent to a value obtained by uniformly dividing the long side of an index sheet by the number of tab ridges (e.g., FIG. 39). The bookbinding application discussed in Japanese Patent Application Laid-Open No. 2006-309790 can print a character string at a correct position on a tab portion.

However, a set of index sheets may have a tab layout illustrated in FIG. 42, according to which a clearance is present between first and second tabs of two stacked sheets. If the bookbinding application discussed in Japanese Patent Application Laid-Open No. 2006-309790 is applied to the tab sheets illustrated in FIG. 42, printing may not be performed appropriately on respective tab portions. Therefore, if a set of tab sheets prepared by a user is different from the presumed tab sheets of a bookbinding application, a character string to be printed on a tab portion may not be printed at an appropriate position.

SUMMARY OF THE INVENTION

Exemplary embodiments of the present invention are directed to a technique capable of appropriately printing a character string on a tab portion.

According to an aspect of the present invention, an information processing apparatus operable to generate print data interpretable by a printing apparatus and to transmit the generated print data to the printing apparatus includes a setting unit for setting information identifying a positional relationship between a tab portion of a first tab sheet and a tab portion of a second tab sheet in a state where the first and second tab sheets are stacked, if usage of the tab sheets is designated, wherein the tab sheet is a tab-attached printing paper to be inserted between printing papers based on print data of document information, and a determination unit configured to determine a print start position of a character string to be printed on the tab portion of the first tab sheet and the tab portion of the second tab sheet according to the information identifying the positional relationship set by the setting unit.

According to another aspect of the present invention, an information processing method for generating print data interpretable by a printing apparatus and transmitting the generated print data to the printing apparatus includes setting information identifying a positional relationship between a tab portion of a first tab sheet and a tab portion of a second tab sheet in a state where the first and second tab sheets are stacked, if usage of the tab sheets is designated, wherein the tab sheet is a tab-attached printing paper to be inserted between printing papers based on print data of document information, and determining a print start position of a character string to be printed on the tab portion of the first tab sheet and the tab portion of the second tab sheet according to the information identifying the positional relationship set by the setting means.

According to yet another aspect of the present invention, a method for an information processing apparatus operable to generate print data interpretable by a printing apparatus and transmit the generated print data to the printing apparatus includes setting information identifying a positional relationship between a tab portion of a first tab sheet and a tab portion of a second tab sheet in a state where the first and second tab sheets are stacked, if usage of the tab sheets is designated, wherein the tab sheet is a tab-attached printing paper to be inserted between printing papers based on print data of document information, and determining a print start position of a character string to be printed on the tab portion of the first tab sheet and the tab portion of the second tab sheet according to the information identifying the positional relationship.

According to yet another aspect of the present invention, a storage medium stores a computer-executable program that causes an information processing apparatus to generate print data interpretable by a printing apparatus and transmit the generated print data to the printing apparatus, and the program includes setting information identifying a positional relationship between a tab portion of a first tab sheet and a tab portion of a second tab sheet in a state where the first and second tab sheets are stacked, if usage of the tab sheets is designated, wherein the tab sheet is a tab-attached printing paper to be inserted between printing papers based on print data of document information, and determining a print start position of a character string to be printed on the tab portion of the first tab sheet and the tab portion of the second tab sheet according to the information identifying the positional relationship.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIGS. 3A and 3B illustrate an example structure of a book file according to an exemplary embodiment, in which FIG. 3A illustrates an example format of a book file and FIG. 3B illustrates an example structure of original data.

FIG. 4 illustrates an example book attribute according to an exemplary embodiment of the present invention.

FIG. 5 illustrates example chapter attributes according to an exemplary embodiment of the present invention.

FIG. 6 illustrates example page attributes according to an exemplary embodiment of the present invention.

DETAILED DESCRIPTION OF THE EMBODIMENTS

Figure 39:
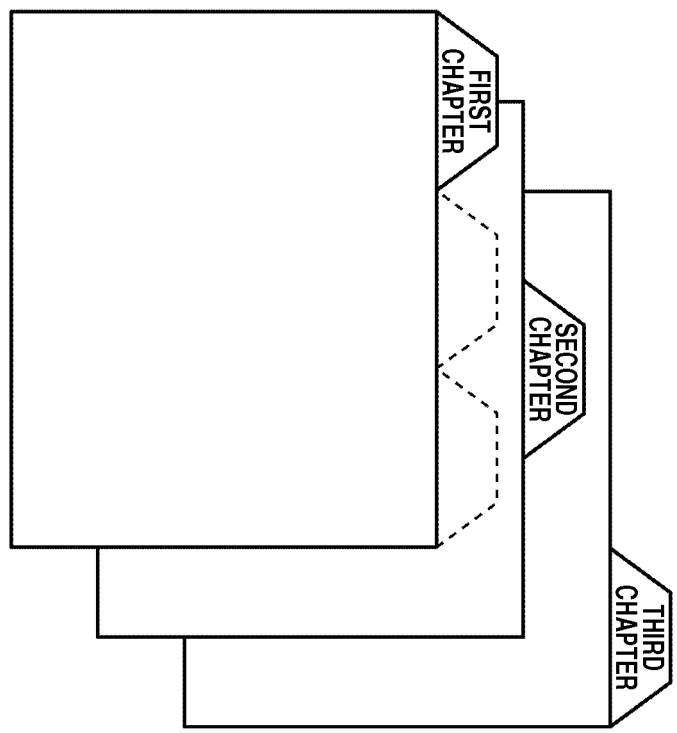
FIG. 39 illustrates example index sheets according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings. Tab sheets described in the following exemplary embodiments are, for example, papers having an eared portion (tab portion) as illustrated in FIG. 39, which can be referred to as index sheets.
First Exemplary Embodiment A document processing system according to a first exemplary embodiment of the present invention is described with reference to FIGS. 1 through 12. The document processing system includes an electronic original writer that can convert a data file generated by a general application into an electronic original file. A book binding application enables a user to edit an electronic original file.

Figure 1:
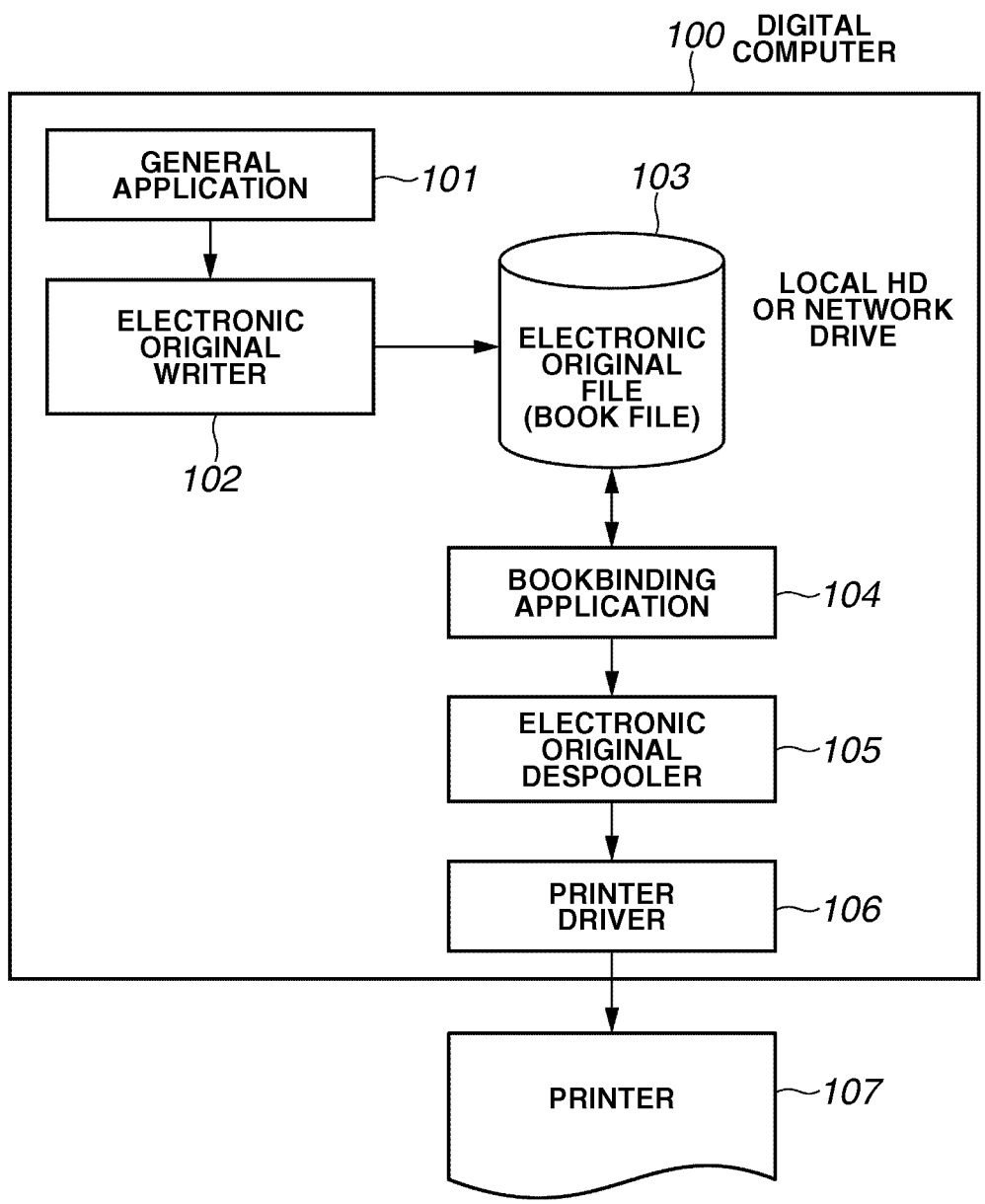
FIG. 1 is a block diagram illustrating an example configuration of a stand-alone type document processing system according to an exemplary embodiment of the present invention.

FIG. 1 illustrates an example software configuration of a document processing system according to an exemplary embodiment.

The document processing system can be realized by a digital computer 100 that can function as an information processing apparatus. The digital computer 100 includes a general application 101 that provides various functions, such as word processing, spreadsheet, photo retouch, draw or paint, presentation, and text editing. The general application 101 has a print function. When a user instructs printing of generated application data (i.e., document data, image data, etc.), the general application 101 uses a predetermined interface provided by an operating system (OS).

Namely, to print generated data, the general application 101 transmits an output command (referred to as a Graphics Device Interface (GDI) function) having an OS-dependent format to an output module of the OS that provides the above-described interface.

On the other hand, the output module receives an output command and converts the received output command into data having a format that can be processed by a printer or other output device. The output module outputs a converted command (referred to as a Device Driver Interface (DDI) function). The format that the output device can process is dependent on the type of each device, a manufacturer, a machine model, etc. Therefore, a device driver of each device provides the format. The device driver generates print data based on application data and generates a print job based on a job language (JL). When the OS is Windows® provided by Microsoft Corporation, the above-described output module is referred to as Graphic Device Interface (GDI).

An electronic original writer 102, corresponding to an improved device driver, is a software module that can realize a document processing system according to an exemplary embodiment of the present invention. The electronic original writer 102 is not a specific output device and generates an electronic original file 103 based on conversion of data into an output command having a predetermined format so that a bookbinding application 104 or a printer driver 106 can process the output command.

The converted format obtained by the electronic original writer 102 (hereinafter, referred to as an "electronic original format") can be any format that can express original data in detail on a page-by-page basis. For example, a Portable Document Format (PDF) provided by Adobe Systems or a Standard Generalized Markup Language (SGML) format can be used as a standard electronic original format.

When the general application 101 uses the electronic original writer 102, the general application 101 designates the electronic original writer 102 as an output device driver before instructing print processing. In general, an electronic original file generated by the electronic original writer 102 does not have a perfect format as an electronic original file. Therefore, the bookbinding application 104 designates the electronic original writer 102 as a device driver.

The bookbinding application 104 manages the conversion of application data into an electronic original file. Then, the bookbinding application 104 completes an electronic original file so as to have a later-described format based on an incomplete electronic original file newly generated by the electronic original writer 102.

In the following description, to explicitly express the above-described features, a file generated by the electronic original writer 102 may be referred to as an "electronic original file" while an electronic original file having been completed by the bookbinding application 104 may be referred to as a "book file." Furthermore, if it is unnecessary to specifically discriminate the files, any document file, any electronic original file, and any book file generated by an application may be simply referred to as a "document file (or document data)."

As described above, when the electronic original writer 102 is designated as a device driver and the general application 101 generates print data, application data can be converted into an electronic original format including pages defined by the general application 101.

Then, the pages converted into an electronic original format can be stored as electronic original file 103 into a hard disk or other storage medium. In the following description, a page defined by the general application 101 can be referred to as a "logical page" or "original page." The hard disk can be a local drive of a computer that realizes the document processing system of the present embodiment, or can be a network drive provided on a network.

The bookbinding application 104 reads the electronic original file (or book file) 103 and enables a user to edit the read file. However, the bookbinding application 104 does not provide any function for editing the contents of each page. The bookbinding application 104 enables a user to edit the structure of a book including chapters on a page-by-page basis.

When a user instructs printing of a book file 103 edited by the bookbinding application 104, the bookbinding application 104 activates an electronic original despooler 105. The electronic original despooler 105 reads a designated book file from the hard disk, and generates an output command adaptable to the above-described output module of the OS so as to print each page according to a format described in the book file. The electronic original despooler 105 outputs the generated command to the output module (not illustrated). In this case, the electronic original despooler 105 designates the printer driver 106 as a device driver for a printer 107 used as an output device.

The output module converts the received output command into a device command interpretable by the printer 107, using the printer driver 106 of the designated printer 107. Then, the device command is transmitted to the printer 107. The printer 107 prints an image based on the command.

Although FIG. 1 illustrates the bookbinding application 104 and the electronic original despooler 105 as separate modules, the bookbinding application 104 can be a module including functions comparable to those of the electronic original despooler 105. In this case, the bookbinding application 104 outputs drawing information (GDI function) based on a generated book file to the output module.

Figure 2:
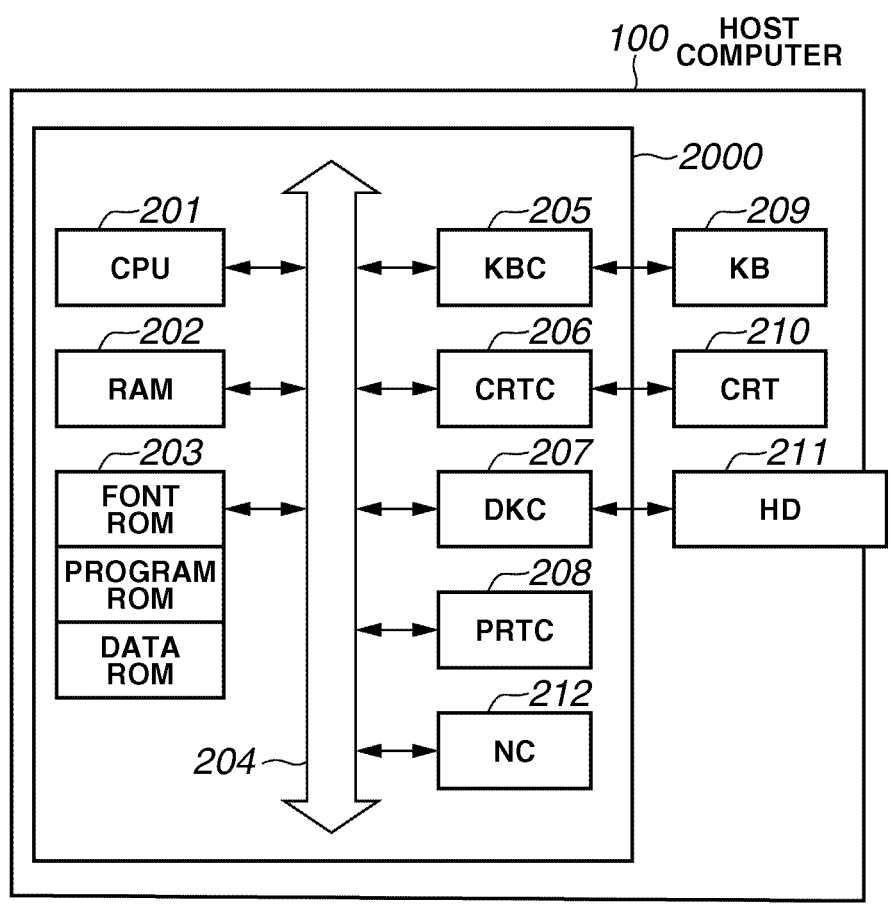
FIG. 2 is a block diagram illustrating an example configuration of a host computer in the document processing system according to an exemplary embodiment of the present invention.

FIG. 2 is a block diagram illustrating an example hardware configuration of the digital computer 100 illustrated in FIG. 1.

In FIG. 2, a central processing unit (CPU) 201 executes various computer programs, including the OS, the general application 101, and the bookbinding application 104, which can be loaded into a random access memory (RAM) 202 from a read-only memory (ROM) 203 (a program ROM) or a hard disk (HD) 211. Furthermore, the CPU 201 can realize the software configuration illustrated in FIG. 1 and the processing of a later-described flowchart.

The RAM 202 is capable of functioning as a main memory and a work area for the CPU 201. A keyboard controller (KBC) 205 controls any key input entered through a keyboard 209 or a pointing device (not illustrated). A cathode ray tube (CRT) controller (CRTC) 206 controls a cathode ray tube (CRT) display unit 210. The display unit 210 is not limited to a cathode ray tube type and can be, for example, a liquid crystal display unit or a plasma display unit.

A disk controller (DKC) 207 controls any access to the HD 211 or a floppy disk (FD), which can store a boot program, various applications, font data, user files, and later-described edit files. A printer controller (PRTC) 208 controls signals sent to or received from the printer 107 connected thereto. A network controller (NC) 212, connected to a network, executes communication control processing when the digital computer 100 communicates with other devices connected to the network.

Prior to a detailed description of the bookbinding application 104, an example data format of the above-described "book file" is described below.

The book file has a three-layer structure resembling a book composed of papers. An upper layer is referred to as a "book" resembling a single book, which can define an attribute relating to the entire book. An intermediate layer, positioned beneath the upper layer, is referred to as a "chapter" that corresponds to a chapter of the book. Each chapter can define an attribute of each chapter. A lower layer is referred to as a "page" that corresponds to each page defined by an application program. Each page can define an attribute of each page. One book can include a plurality of chapters. One chapter can include a plurality of pages.

Figure 3A:
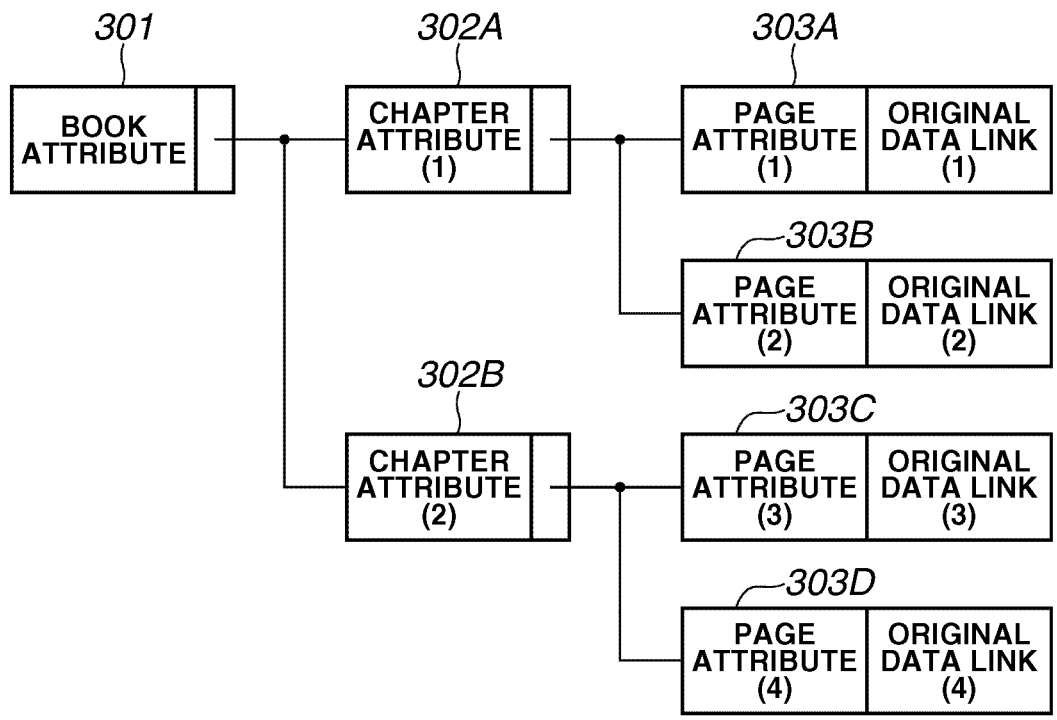

FIG. 3A illustrates an example format of the book file including a book, chapters, and pages denoted by corresponding nodes. One book file includes one "book." Both the "book" and the "chapter" are the concept that defines a book structure and include defined attribute values and a link to a lower layer, as its entity. The "page" includes data for each page generated by the application program, as its entity. Therefore, the "page" includes the entity of original page (i.e., original page data) and a link to each original page data, in addition to its attribute values.

A print page output to a paper medium may include a plurality of original pages. The structure of each print page is not displayed as a link and displayed as part of the attributes for the "book", the "chapter", or the "page."

Figure 3B:

In FIG. 3A, a book 301 defines its attribute (book attribute) and includes two chapters 302A and 302B linked together. The chapter 302A includes two pages 303A and 303B linked together. The page 303A defines attribute value (1) and includes a link to corresponding original page data (1). The page 303B defines attribute value (2) and includes a link to corresponding original page data (2). The original page data is the entity of each page. Similarly, the chapter 302B includes two pages 303C and 303D linked together. The page 303C defines attribute value (3) and includes a link to corresponding original page data (3). The page 303D defines attribute value (4) and includes a link to corresponding original page data (4). FIG. 3B illustrates example original page data 304 including the original page data (1) to (4) representing the entity of pages 303A, 303B, 303C and 303D.

FIG. 4 illustrates example book attributes 301 according to an exemplary embodiment.

An item, that can be defined in both upper and lower layers, describes its effective attribute value in the lower layer. Therefore, an item involved only in the book attribute 301 has an attribute value which is valid in the entire book. However, an item defined in the book attribute that can also be defined in a lower layer, is valid when the item is not defined in the lower layer. In the example illustrated in FIG. 4, each item may not correspond to a single item and may include a plurality of relevant items.

FIG. 5 illustrates an example list of chapter attributes. FIG. 6 illustrates an example list of page attributes. The relationship between the chapter attributes and the page attributes is similar to the relationship between the book attributes and lower layer attributes.

In FIG. 4, a total of seven items of "print method", "binding margin/binding direction", "details of bookbinding", "front cover/back cover", "index sheet", "interleaf", and "chapter break" are items unique to the book attribute 301 and defined as valid throughout the book.

The "print method" attribute enables a user to designate, as a print method, "one-sided printing", "two-sided printing", or "bookbinding printing." The "bookbinding printing" is performed according to a predetermined format so that a book can be formed through sequential processes including bundling a designated number of sheets, folding the sheets, and stitching the sheets. The "details of bookbinding" attribute enables a user to designate "opening direction", "total number of bundled sheets", or the like when the user selects the bookbinding printing.

The "front cover/back cover" attribute enables a user to add a front cover and a back cover for an electronic original file printed as a book and designate print contents on the added covers. The "index sheet" attribute enables a user to designate an insertion of an eared index sheet, as a break of chapter, which is separately prepared for a printing apparatus and also enables a user to designate print contents on the index eared portion.

The "index sheet" attribute is valid for a printing apparatus equipped with an inserter that can insert a specially provided sheet into a desired position of the printed papers. The "index sheet" attribute is valid when a printer has a plurality of paper feed cassettes. The same thing is applied to the "interleaf" attribute.

The "interleaf" attribute enables a user to designate, as a break of a chapter, insertion of a sheet or an interleaf from an inserter or a paper feed cassette and also designate a paper feed source.

The "chapter break" attribute enables a user to designate the usage of a new paper or the usage of a new print page at a breakpoint of a chapter. When a user selects the "one-sided printing", using a new paper and using a new print page are not different in the meaning. If a user designates the "usage of a new paper" in the two-sided printing, consecutive chapters are not printed on the same paper. On the other hand, if a user designates the "usage of a new print page", consecutive chapters can be printed on front and back surfaces of a paper.

The chapter attributes illustrated in FIG. 5 do not include any item(s) unique to the chapter. All of the chapter attributes are involved in the book attributes. Therefore, if definitions in the chapter attributes disagree with definitions in the book attributes, the values defined in the chapter attributes are effective.

Five items of "paper size", "paper orientation", "N-up print designation", "enlarge/reduce", and "paper discharge method" are items commonly included in the book attributes and the chapter attributes. The "N-up print designation" attribute is an item enabling a user to designate the number of original pages on a piece of printed paper. For example, a user can select a page layout from the group including 1×1, 1×2, 2×2, 3×3, and 4×4. The "paper discharge method" attribute is an item enabling a user to determine whether staple processing for discharged papers is to be performed, although the "paper discharge method" attribute is only valid for a printing apparatus having a stapling function.

In FIG. 6, five items of "page rotation designation", "zoom", "placement designation", "annotation", and "page division" are items unique to the page attributes. The "page rotation" attribute is an item enabling a user to designate a rotational angle of an original page disposed on a printed page. The "zoom" attribute is an item enabling a user to designate a zoom ratio of an original page. The zoom ratio designates a size relative to a virtual logical page region (i.e., 100%).

The virtual logical page region is a region occupied by one original page when the original page is disposed according to an N-up designation. For example, if the selected page layout is 1×1, the virtual logical page region is a region corresponding to one printed page. If the selected page layout is 1×2, the virtual logical page region is a reduced region having each side equivalent to approximately 70% of a corresponding side of one printed page.

Two attribute items "watermark" and "header/footer" are commonly included in the "book", "chapter", and "page" attributes. The "watermark" is an image or a character string which can be superposed on print data generated by an application. The "header/footer" is information printed in a top margin and/or a bottom margin of each page. The "header/footer" includes item(s) that can be designated with variables, such as a page number and date/time. The contents designated in the "watermark" attribute and the "header/footer" attribute are similarly defined in the chapter attributes and the page attributes.

However, the "book" attributes are different from the "chapter" attributes and the "page" attributes. The "book" attributes can define the contents of "watermark" or "header/footer" and also designate a print method of the "watermark" or "header/footer" throughout the book. On the other hand, the "chapter" attributes and the "page" attributes can determine whether the "watermark" and the "header/footer" defined in the book attributes are applied to that respective "chapter" or that respective "page."

The "book file", i.e., an electronic original file having a structure determined by the bookbinding application 104, has the above-described structure and contents. The bookbinding application 104 and the electronic original writer 102 generate a book file according to the following procedure. The book file generation procedure is part of a book file editing operation performed by the bookbinding application 104.

Figure 7:
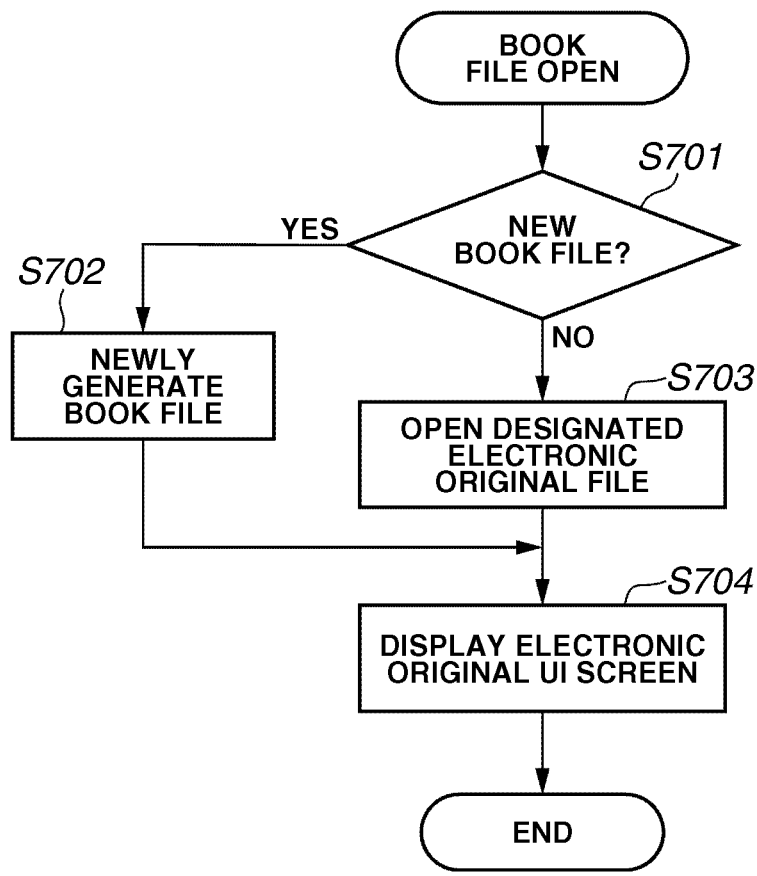
FIG. 7 is a flowchart illustrating an example procedure for opening a book file according to an exemplary embodiment of the present invention.

FIG. 7 is a flowchart illustrating an example procedure for opening a book file performed by the bookbinding application 104.

At step S701, the bookbinding application 104 determines whether a book file to be opened (i.e., target file) is a new file or an already existing file. If the bookbinding application 104 determines that the opened book is a new file (YES in step S701), the processing flow proceeds to step S702.

At step S702, the bookbinding application 104 newly generates a book file including no chapters. Referring to the example illustrated in FIG. 3A, a newly generated book file has only the book attribute 301 (book node) and does not have any link to a chapter node. A set of book attributes for a new book file is prepared beforehand.

On the other hand, if the bookbinding application 104 determines that the opened book is not a new file (NO in step S701), the processing flow proceeds to step S703. At step S703, the bookbinding application 104 opens a designated electronic original file and displays a user interface (UI) screen according to the structure, attributes, and contents of the opened designated book file.

At step S704, the bookbinding application 104 displays a user interface (UI) screen to enable a user to edit a new book file.

Figure 11:
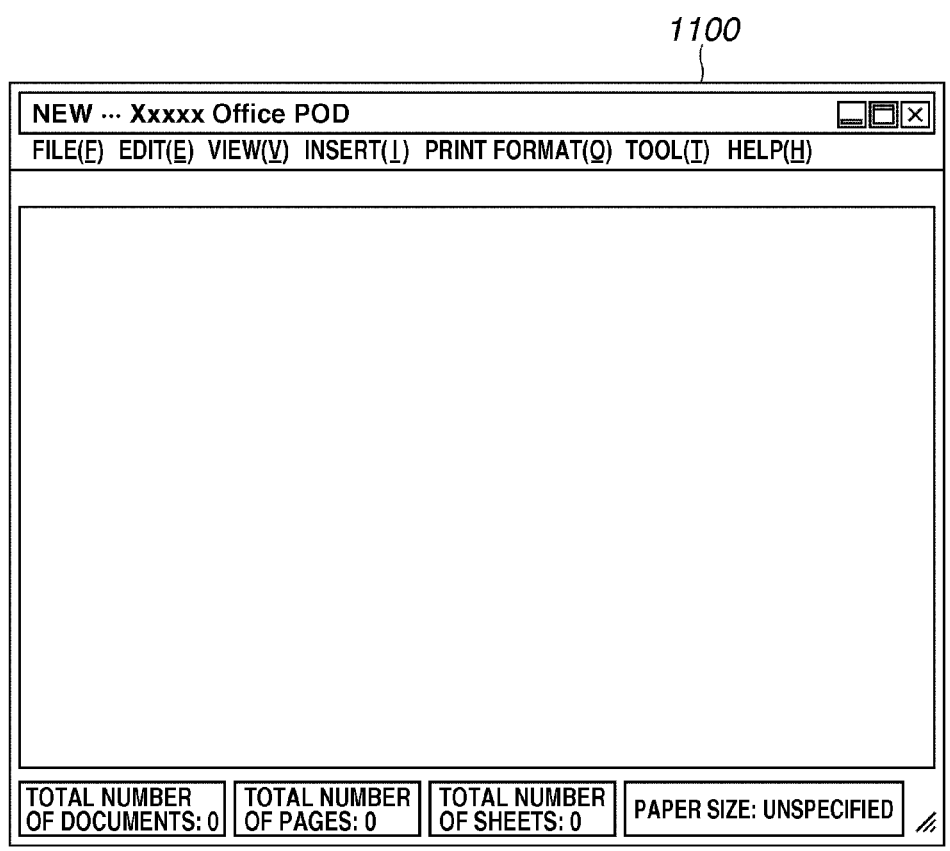
FIG. 11 illustrates an example user interface screen displayed when a new book file is generated.

FIG. 11 illustrates an example UI screen displayed when a book file is newly generated. In this case, the new book file has no substantial contents and, therefore, nothing is displayed on a UI screen 1100.

Figure 10:
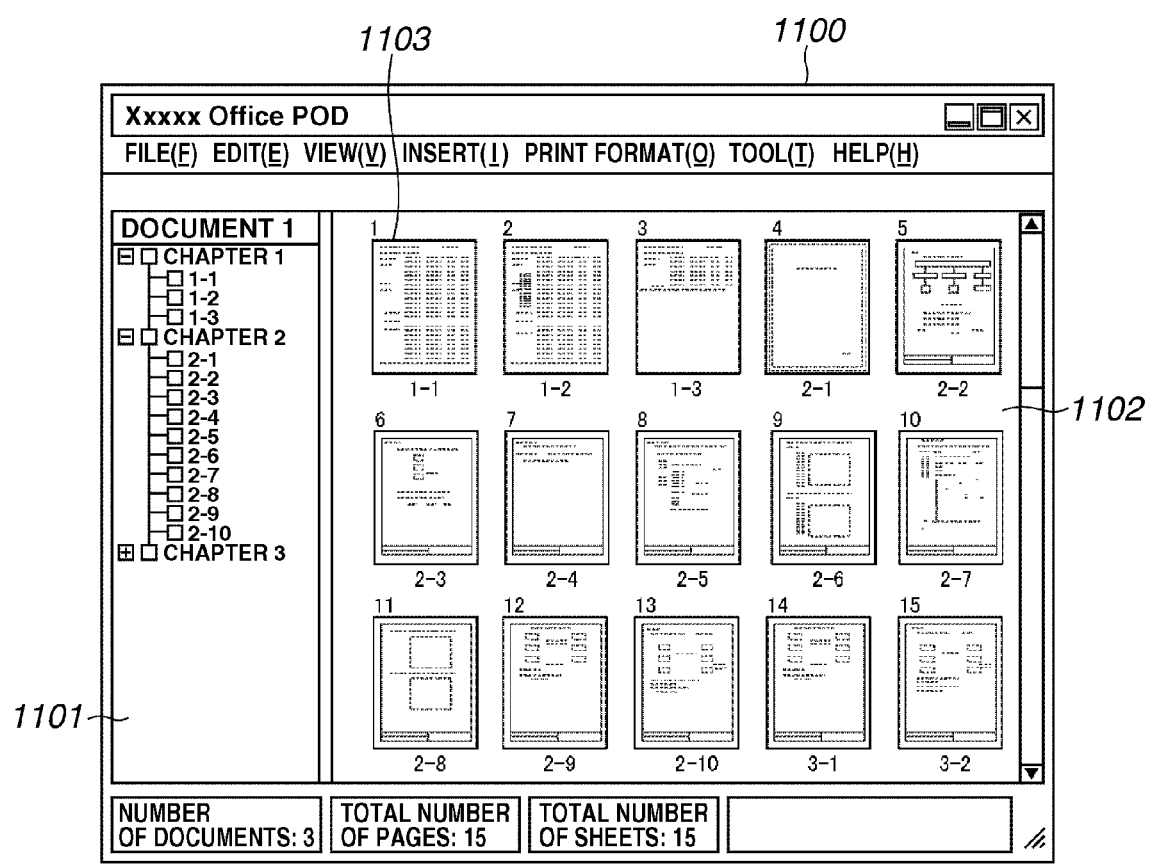
FIG. 10 illustrates an example user interface screen displayed when an already existing book file is designated.

FIG. 10 illustrates an example UI screen displayed when an already existing book file is designated.

The UI screen 1100 includes a tree section 1101 that illustrates a book structure and a preview section 1102 that displays a state of print pages. The tree section 1101 displays all chapters included in a book and pages included in each chapter to form a tree structure as illustrated in FIG. 3A. The tree section 1101 displays a page number. The page number indicates the number of an original page. The preview section 1102 displays a reduced image 1103 of each print page. The display order in the preview section 1102 reflects the structure of a book.

Any application data converted into an electronic original file by the electronic original writer 102 can be added, as a new chapter, to the opened book file. This function is referred to as "electronic original import function." When an electronic original is imported to the book file newly generated according to the procedure illustrated in FIG. 7, the book file can possess a substantial entity. The electronic original import function can be activated when a user drags and drops any application data on the screen illustrated in FIG. 10.

Figure 8:
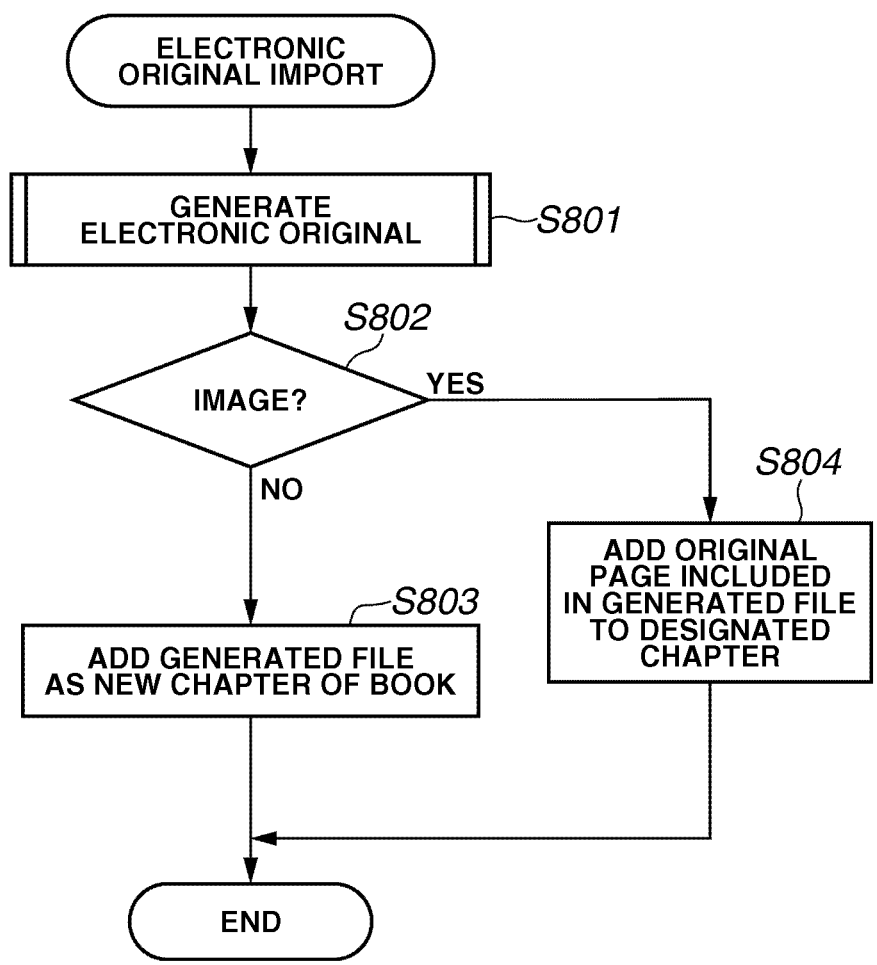
FIG. 8 is a flowchart illustrating an example procedure for importing an electronic original file to a book file according to an exemplary embodiment of the present invention.

FIG. 8 is a flowchart illustrating an example procedure for importing an electronic original.

First, the CPU 201 activates an application program that has generated designated application data. At step S801, the electronic original writer 102, which is designated as a device driver, converts the application data generated by the general application 101 into electronic original data.

At step S802, the bookbinding application 104 determines whether the converted electronic original data is image data, for example, based on a file extension of the application data if the OS is Windows®. More specifically, for example, if the extension is "bmp", the bookbinding application 104 can determine that the converted data is Windows® bitmap data. If the extension is "jpg", the bookbinding application 104 can determine that the converted data is Joint Photographic Experts Group (JPEG) compression image data. If the extension is "tiff", the bookbinding application 104 can determine that the converted data is Tagged Image File Format (TIFF) image data. Furthermore, if the converted data is image data, the bookbinding application 104 can directly generate an electronic original file based on image data without activating any application (step S801).

If the bookbinding application 104 determines that the converted data is not image data (NO in step S802), the processing flow proceeds to step S803. At step S803, the bookbinding application 104 adds the electronic original file generated in step S801 to the presently opened book file as a new chapter of the book. In this case, if items are commonly defined for the book attributes and the chapter attributes, the bookbinding application 104 copies attribute values of the book attributes for the chapter attributes. Otherwise, the bookbinding application 104 sets default values prepared beforehand.

If the converted data is image data (YES in step S802), the processing flow proceeds to step S804. At step S804, the bookbinding application 104 does not add any new chapter in principle. The bookbinding application 104 adds each original page of the electronic original file generated in step S801 to a designated chapter. However, if a new book file is generated, a new chapter is generated and each page of an electronic original file is added as a page belonging to this chapter.

The page attributes may include attribute values commonly used for the page attributes and upper layer attributes or attribute values defined by application data if continuously used for an electronic original file. For example, if "N-up printing" is designated in the application data, its attribute values can be continuously used. In this manner, a new book file is generated or a new chapter is added.

Figure 9:
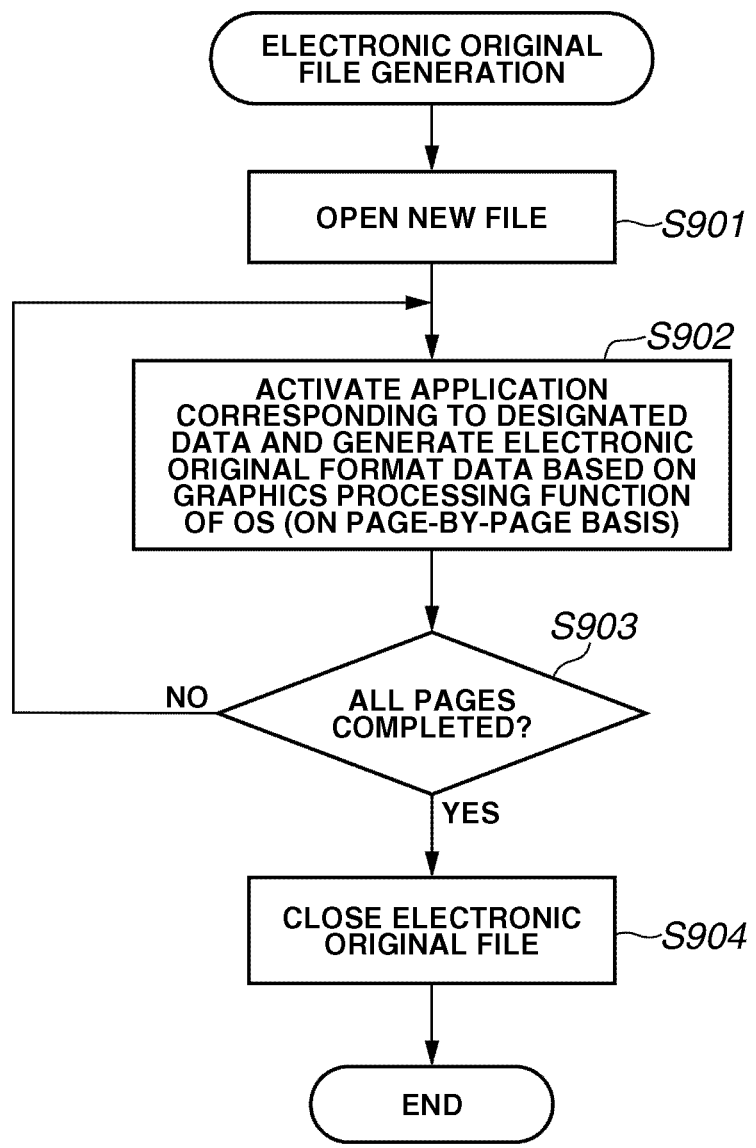
FIG. 9 is a flowchart illustrating an example procedure for converting application data into an electronic original file according to an exemplary embodiment of the present invention.

FIG. 9 is a flowchart illustrating an example procedure performed at step S801 in FIG. 8, according to which the electronic original writer 102 generates an electronic original file.

At step S901, the electronic original writer 102 generates and opens a new electronic original file. Then, the processing flow proceeds to step S902. At step S902, the electronic original writer 102 activates an application corresponding to designated application data and transmits an output command to an output module of the OS while designating the electronic original writer 102 as a device driver. The output module causes the electronic original writer 102 to convert the received output command into electronic original format data, and outputs the converted data to the electronic original file opened in step S901.

Then, at step S903, the electronic original writer 102 determines whether the conversion processing has been completed for all designated data. If the electronic original writer 102 determines that the conversion processing for all designated data has been completed (YES in step S903), the processing flow proceeds to step S904 to close the electronic original file. If the electronic original writer 102 determines that the conversion processing for all designated data has not been completed (NO in step S903), the processing flow returns to step S902. An electronic original file generated by the electronic original writer 102 in this manner is a file that includes the entity of the original page data illustrated in FIG. 3B.

The present embodiment allows a user to perform the following edit operations for each chapter and each page of a book file generated based on application data as described above.
(1) new addition
(2) delete
(3) copy
(4) cut
(5) paste
(6) shift
(7) change chapter name
(8) renumber/rename page
(9) insert cover
(10) insert interleaf
(11) insert index sheet
(12) original page layout Furthermore, the present embodiment allows a user to cancel an editing operation after having been performed or allows a user to instruct executing a once-canceled operation. In short, the editing functions according to the present embodiment enable a user to perform various operations including integration of a plurality of book files, relocation of chapters and pages in a book file, deletion of chapters and pages in a book file, layout change of an original page, and insertion of an interleaf or an index sheet.

If a user performs the above-described operations, the system according to the present embodiment adds the operation result to the attributes illustrated in FIGS. 4 to 6 or changes the structure of a book file.

For example, if a user instructs addition of a new blank page, the system according to the present embodiment inserts a blank page to a designated portion. The inserted blank page is regarded as an original page. Furthermore, if a user changes the layout of an original page, the system according to the present embodiment adds the change contents as part of the attributes (e.g., print method, N-up print, front cover/back cover, index sheet, interleaf, and chapter break).

A book file generated/edited as described above is printed as a final output. If a user selects a file menu from the UI screen 1100 of the bookbinding application illustrated in FIG. 10 and designates printing of the selected file name, a designated output device prints out the selected file. In this case, the bookbinding application 104 generates a job ticket based on the presently opened book file and transmits the generated job ticket to the electronic original despooler 105.

The electronic original despooler 105 receives the job ticket and converts the received ticket into an output command of the OS (e.g., GDI command of Windows®) and transmits the output command to an output module (e.g., GDI). The output module generates a command adaptable to the output device with the designated printer driver 106 and transmits the generated command to the output device.

The job ticket has a data structure including original pages (minimum units). The data structure for a job ticket defines the layout of original pages on a paper. One job ticket can be issued for one job. Therefore, a job ticket includes an uppermost-layer node "document" which defines attributes of the entire document, such as two-sided printing/one-sided printing. Paper nodes, each positioned below the document node, include an identifier of paper to be used and designation of a paper feed port of a printer.

A node of a page printed with the paper belongs to each paper node. One sheet corresponds to a piece of printing paper. A printed page (i.e., a physical page) belongs to each sheet. If the print method is one-sided printing, one physical page belongs to one sheet. If the print method is two-sided printing, two physical pages belong to one sheet. A disposed original page belongs to each physical page. Furthermore, attributes for a physical page include the layout of an original page.

The electronic original despooler 105 converts the above-described job ticket into a command to be supplied to the output module.

As described above, the document processing system according to the present embodiment is a stand-alone type. Generation and editing of a book file can be realized by a similar arrangement and procedure even if the present embodiment is applied to an expanded server-client system, although a book file and print processing would, in that case, be managed by the server.

Figure 12:
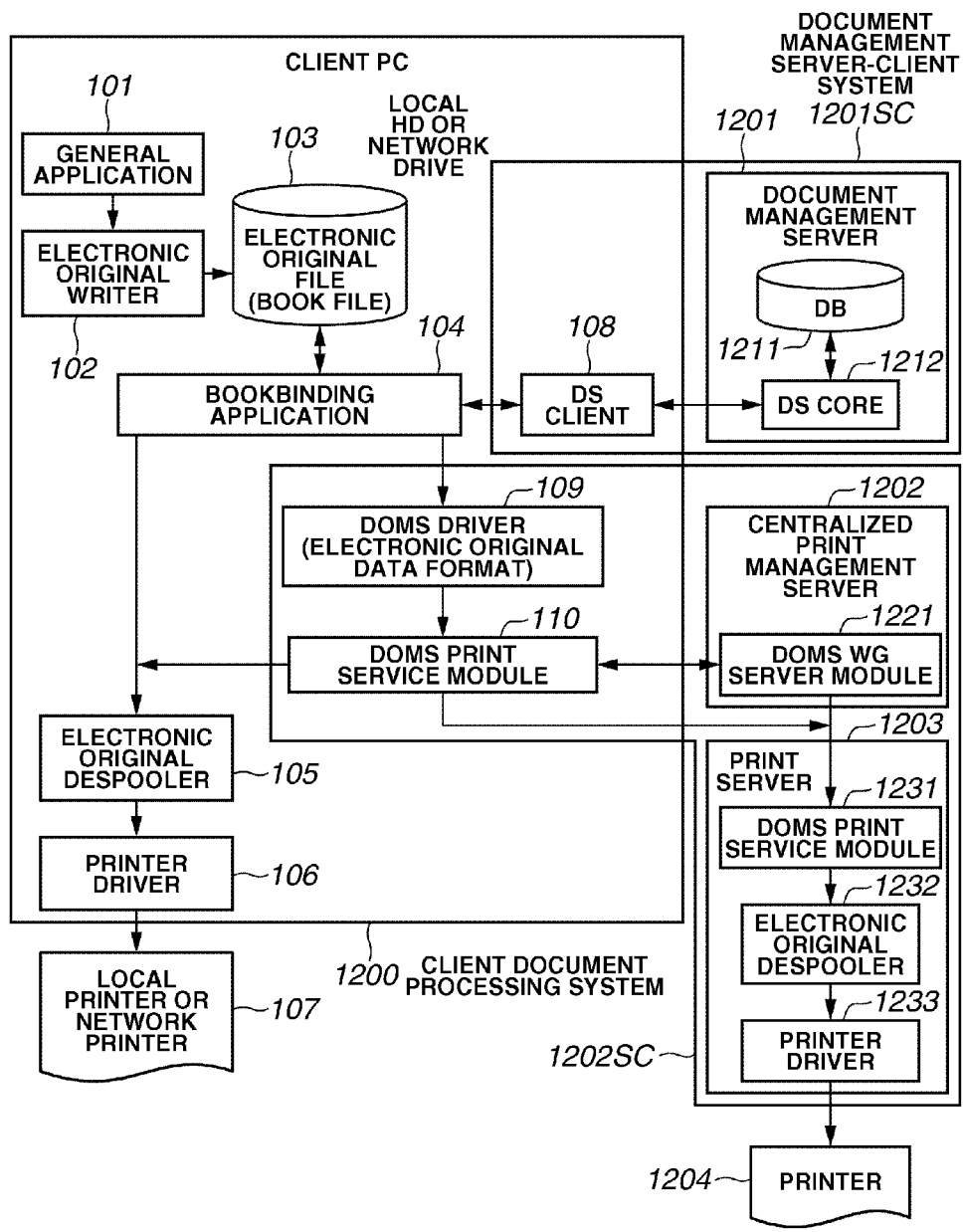
FIG. 12 is a block diagram illustrating an example configuration of a client server type document processing system according to an exemplary embodiment of the present invention.

FIG. 12 is a block diagram illustrating an exemplary configuration of a server-client type document processing system.

A client document processing system 1200 includes client modules, such as a Document Output Management Service (DOMS) driver 109, a DOMS print service module 110, and a document service (DS) client module 108, in addition to the arrangement of a stand-alone type system.

The client document processing system 1200 is connected to a document management server 1201, a centralized print management server 1202, and a print server 1203, via an ordinary network. However, if the server can function as a client, the servers 1201 through 1203 can be connected to the client document processing system 1200 using interprocess communication simulating the internetwork communication.

According to the example illustrated in FIG. 12, both the document management server 1201 and the centralized print management server 1202 are connected to the client. However, only one of the document management server 1201 and the centralized print management server 1202 may be connected to the network.

For example, if only the document management server 1201 is connected to the network, a document management server-client system 1201SC including the client module 108 of the document management server 1201 is added to the stand-alone type document management system.

Furthermore, if only the centralized print management server 1202 is connected to the network, a print management server-client system 1202SC including client modules of the centralized print management server 1202 is added to the stand-alone type document management system.

If a connected server is the centralized print management server 1202, a printing management server-client system 1202SC including its client modules is added to the stand-alone type document management system.

The document management server 1201 is a server capable of storing book files generated and edited by the bookbinding application 104. The document management server 1201 has a database 1211 that can store book files to be managed, although the book files can be also stored in a local HD of the client PC. The book file storage and reading processing between the bookbinding application 104 and the document management server 1201 is performed via the DS client 108 and a DS core 1212.

The centralized print management server 1202 manages printing of a book file stored in the client document management system 1200 or in the document management server 1201. A print request issued by the client is transmitted via the DOMS driver 109 and the DOMS print service module 110 to a document output management service workgroup (DOMSWG) server module 1221 of the centralized print management server 1202.

When printing is performed by the printer 107 of the client, the centralized print management server 1202 sends electronic original data to the electronic original despooler 105 via the DOMS print service module 110 of the client.

Furthermore, when printing is performed by the print server 1203, the centralized print management server 1202 transmits the electronic original data to a DOMS print service module 1231 of the print server 1203. For example, the centralized print management server 1202 performs a security check about qualification of a user who has requested a print of a stored book file and stores a print processing log. As described above, the document processing system can be arranged as a stand-alone system or a client server system.

As described above, when the bookbinding application 104 opens a book file, the bookbinding application 104 displays the user interface screen 1100 illustrated in FIG. 10. A tree illustrated in the tree section 1101 represents a structure of the opened book (hereinafter, referred to as "target book"). The present embodiment prepares three display methods for a print preview section 1102, which can be selected according to a user's preference.

A first display method is referred to as "original view mode" which directly displays reduced images of original pages belonging to the target book, although the display in the preview section 1102 does not reflect the layout. A second display method is referred to as "print view mode" which displays original page images in the preview section 1102 that reflects the layout of the original pages. A third display method is referred to as "simple print view mode" which does not display the contents of each original page in the preview section 1102 although the layout is reflected.

Next, an example configuration of a document processing system including a host computer 100 and the printer 107 according to an exemplary embodiment is described below. The host computer 100 (which may be referred to as a "client") has a configuration similar to that described with reference to FIG. 2. Furthermore, the printer 107 can be a local printer connected to the client or a printer 1204 (FIG. 12) connected to the server.

Figure 13:
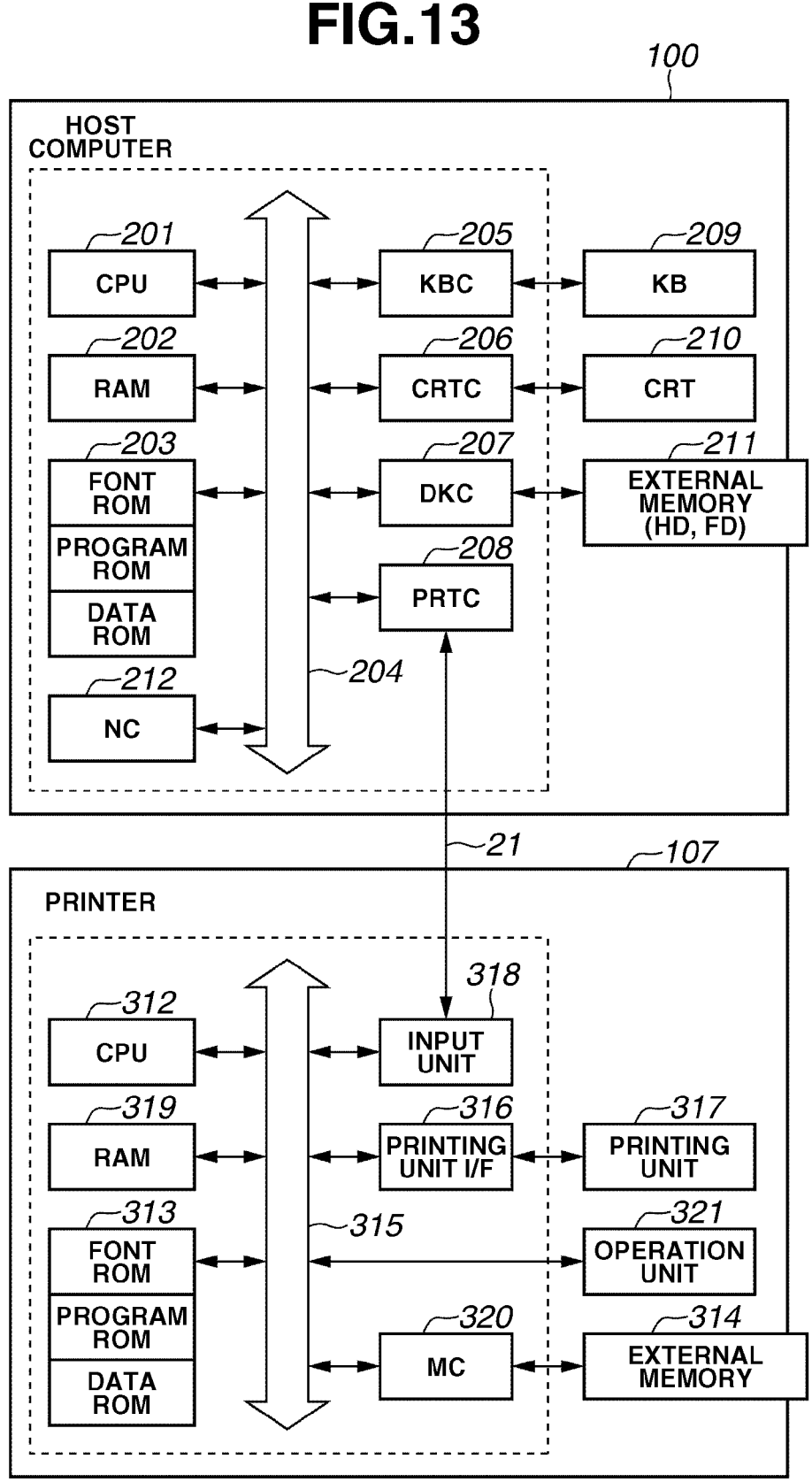
FIG. 13 is a block diagram illustrating an example configuration of a host computer and a printer in the document processing system according to an exemplary embodiment of the present invention.

FIG. 13 is a block diagram illustrating an example configuration of the document processing system according to an exemplary embodiment of the present invention. The system according to the present embodiment can be arranged by a single device, a system including a plurality of devices, or a network system including devices connected via a local area network (LAN) or wide area network (WAN), which can realize the functions of an exemplary embodiment. The host computer 100 has a hardware configuration similar to that illustrated in FIG. 2, although the host computer 100 can transmit print data to the printer 107 that can interpret generated print data.

The printer 107 includes a central processing unit (CPU) 312 that controls various operations performed by the printer 107. The CPU 312 generates an image signal based on a control program stored in a read only memory (ROM) 313, i.e., program ROM, or based on a control program loaded into a random access memory (RAM) 319 from an external memory 314, and outputs the image signal as output information to a printing unit 317 connected via a system bus 315.

The printing unit 317 corresponds to a printer engine. The ROM 313 has an area (i.e., program ROM) that stores control programs executable by the CPU 312, an area (i.e., font ROM) that stores font data used when the CPU 312 generates the output information, and an area (i.e., data ROM) that stores information used on the host computer 100 when the printer 107 cannot use a hard disk or other external memory 314.

Furthermore, the CPU 312 can communicate with the host computer 100 via an input unit 318 to transmit information of the printer 107 to the host computer 100. The RAM 319 functions as a main memory or a work area for the CPU 312. The printer 107 has an expansion port (not illustrated) to which an optional RAM can be connected to increase the memory capacity. The RAM 319 can be used as an output information expansion area, an environmental data storage area, or a nonvolatile random access memory (NVRAM).

A memory controller (MC) 320 controls every access to the external memory 314, such as a hard disk (HD) or an IC card. The external memory 314 is connectable as an optional device and usable as a storage device for font data, emulation programs, and form data. An operation unit 321 includes various operation switches and a light-emitting diode (LED) display unit.

The above-described external memory 314 is not limited to a single memory and can be a plurality of memories which, for example, store programs capable of interpreting the language of an optional card or the control language of a different printer in addition to built-in fonts. Furthermore, the external memory 314 can include an NVRAM (not illustrated) which stores printer mode setting information entered via the operation unit 321.

The host computer 100 includes the file 103, the bookbinding application 104, the despooler 105, and the driver 106 illustrated in FIG. 1. The electronic original writer 102 generates the electronic original file 103 based on a document file (application data) generated by the general application 101. The bookbinding application 104 can open the electronic original file 103, as described above.

The bookbinding application 104 causes the display unit 210 to display an operation screen illustrated in FIG. 10. The bookbinding application 104 is different from the general application 101 in that the bookbinding application 104 has a print setting function that can be generally provided by the printer driver 106.

Thus, the bookbinding application 104 can perform various print settings on the electronic original file 103, including function settings of the printer 107 (designation of staples and punch holes) in addition to ordinary editing functions (change of document page order, copy, delete, etc.). Then, the bookbinding application 104 generates an instruction to perform print processing using a designated printer according to the setting information. The bookbinding application 104 described in exemplary embodiments of the present invention can be referred to as print setting application.

Figure 14:
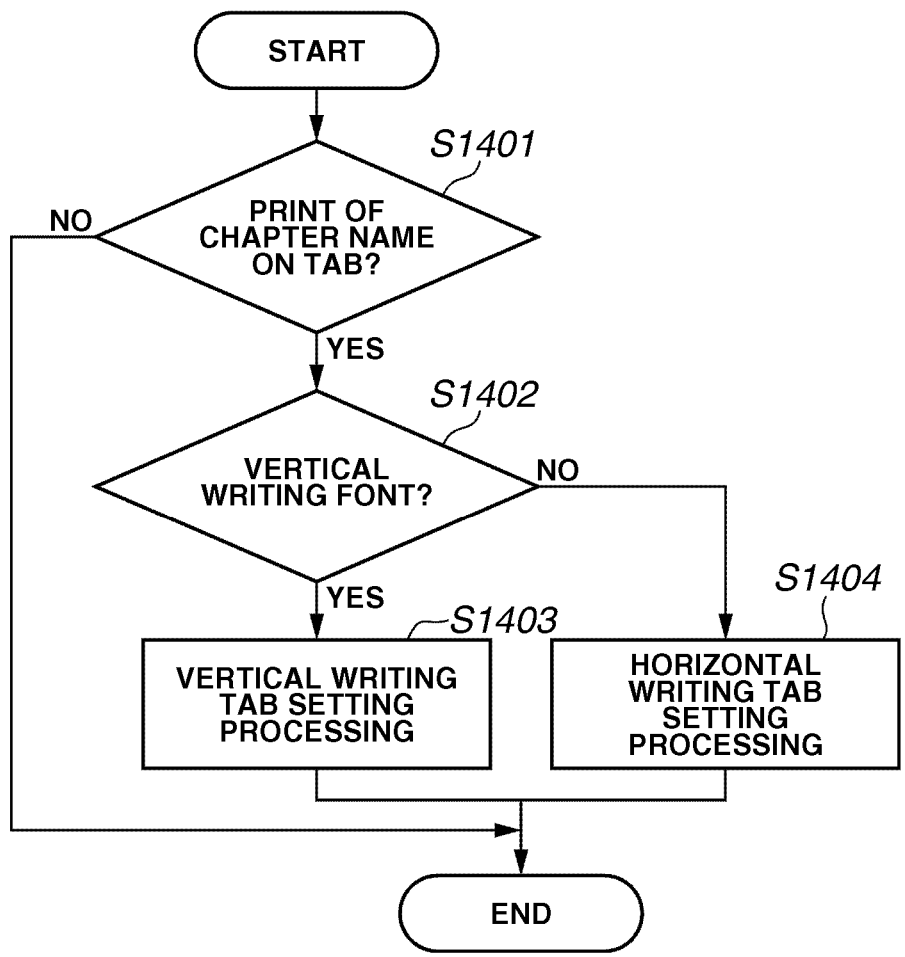
FIG. 14 is a flowchart illustrating example processing for writing a character string on a tab performed by the document processing system according to an exemplary embodiment of the present invention.

FIG. 14 is a flowchart relating to settings for instructing insertion of a front cover or an index sheet into a document of an electronic original file using a "paper insertion setting" function of the bookbinding application 104 and printing a chapter name on a tab of the index sheet. An index sheet according to an exemplary embodiment can be used as a chapter break. Furthermore, the "paper insertion setting" function is one of specific print setting functions that the general application 101 does not possess.

Prior to description of the flowchart illustrated in FIG. 14, an example "paper insertion setting" is described below with reference to FIGS. 15 and 16.

Figure 15:
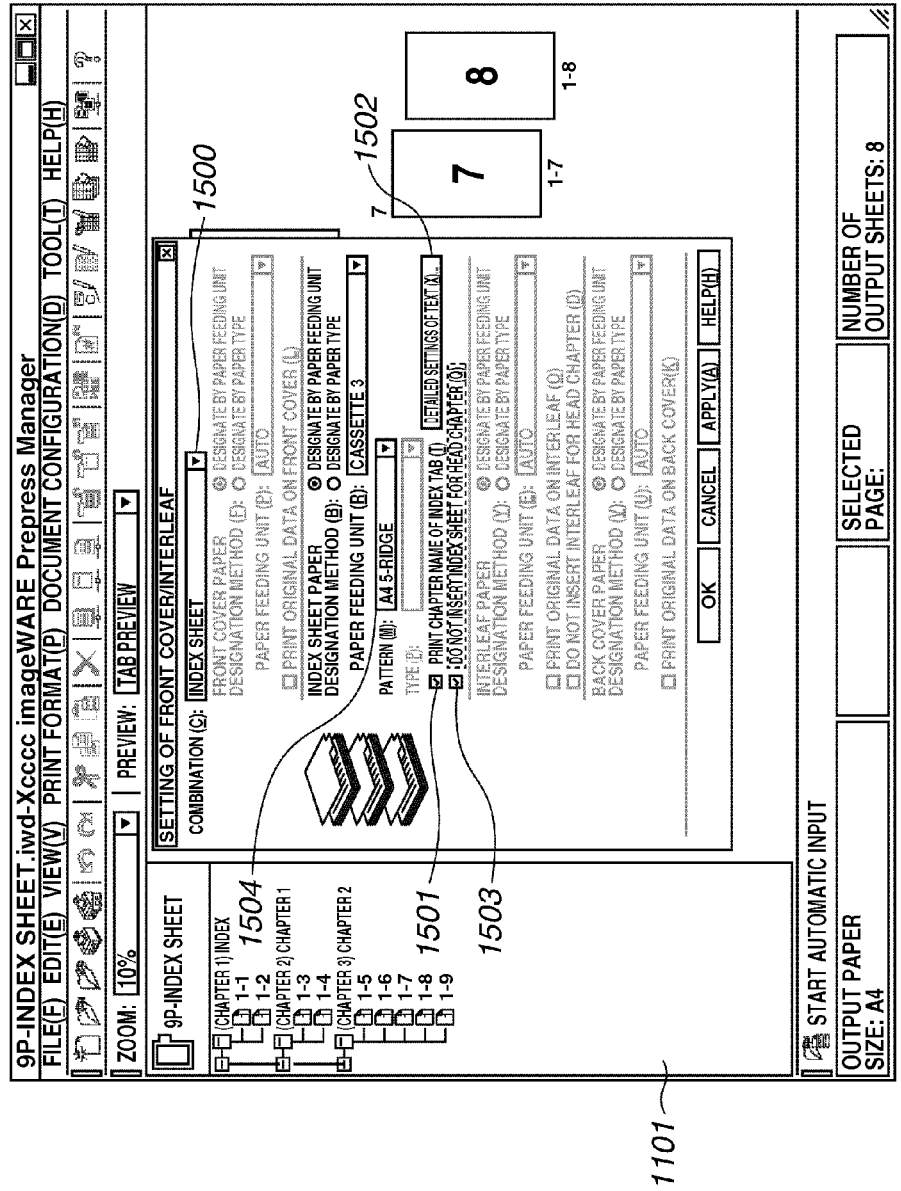
FIG. 15 illustrates an example user interface screen enabling a user to perform index sheet insertion settings according to an exemplary embodiment.

FIG. 15 illustrates an example "paper insertion setting" window display provided by the bookbinding application 104 according to an exemplary embodiment.

In FIG. 15, an area 1500 enables a user to instruct combination of a paper to be inserted. According to this example, an "index sheet" displayed in the area 1500 means that a user instructed insertion of an index sheet. Namely, the bookbinding application 104 sets a tab-attached printing paper as an insertion paper to be inserted between printing papers based on print data of document information according to the user's setting.

Furthermore, the bookbinding application 104 can set, as insertion papers, all of "front cover", "index sheet", "interleaf", and "back cover", or any combination or single item selected from them. The "front cover", "index sheet", "interleaf", and "back cover" designated by a user via this dialog box are not present as actual document data in an electronic original file and can be managed as print setting information in an electronic original file. Therefore, a user can instruct or cancel insertion of an index sheet by simply changing print settings via the dialog box (i.e., putting or removing a check mark to or from the check box or changing a tag). Thus, the user's operability can be greatly improved.

Furthermore, as illustrated in FIG. 15, a check box 1503 enables a user to instruct "no index sheet is required for a first chapter of a document." This instruction means that an index sheet is inserted for each of second and following chapters.

Figure 37:
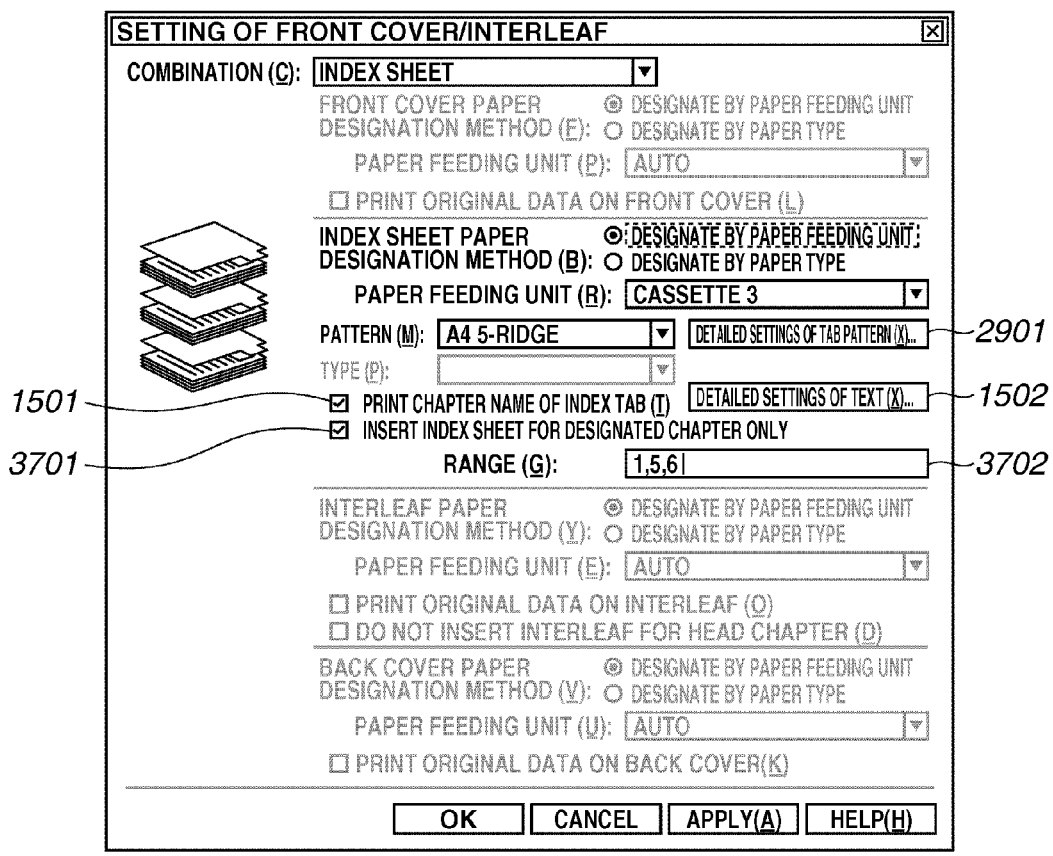
FIG. 37 illustrates an example user interface screen enabling a user to set a character string to be printed on a tab of an index sheet, which includes setting of an insertion position of an index sheet, according to an exemplary embodiment of the present invention.

Furthermore, a user can designate insertion of an index sheet for a limited number of chapters selected by a user using a range setting field 3702 illustrated in FIG. 37.

Figure 22:
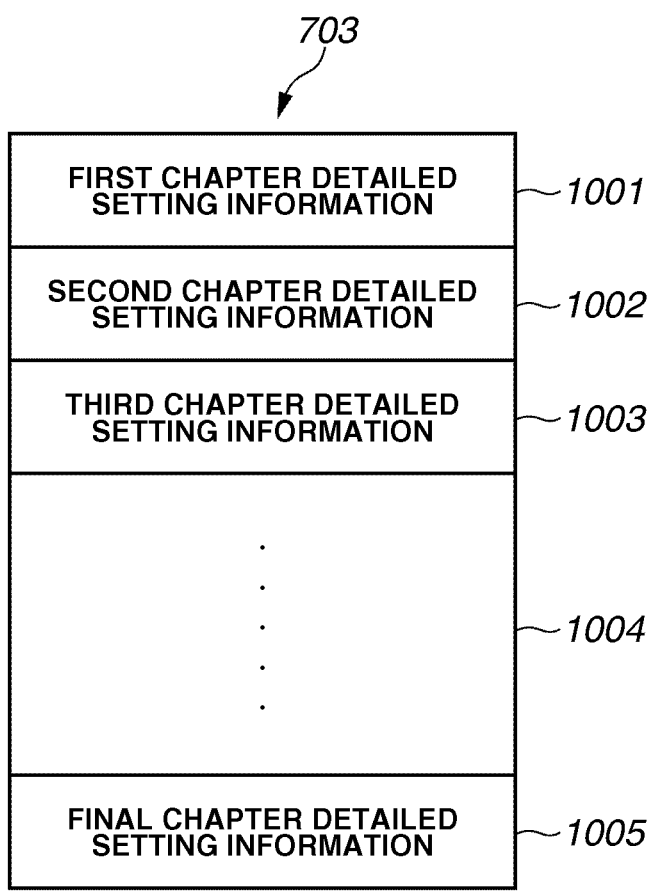
FIG. 22 illustrates detailed setting information of each chapter according to an exemplary embodiment of the present invention.

Furthermore, a user can check a check box 1501 of "print chapter name on tab of index sheet." The bookbinding application 104 designates printing of a name of each chapter displayed in the tree section 1101 illustrated in FIG. 10, for each chapter, on a tab portion of an index sheet to be inserted. The name of each chapter is stored beforehand as setting information of each chapter (FIG. 22).

Furthermore, if a user instructs via a "pattern" designation area 1504 on the window illustrated in FIG. 15, the bookbinding application 104 designates a size of index sheet and the number of tabs for a set of index sheets. According to the example illustrated in FIG. 15, "A4 5-ridge" is set in the "pattern" designation area 1504. This means that an index sheet has an A4 size and five index sheets constitute one set. Therefore, the number of tabs for this set of index sheets is 5.

Figure 16:
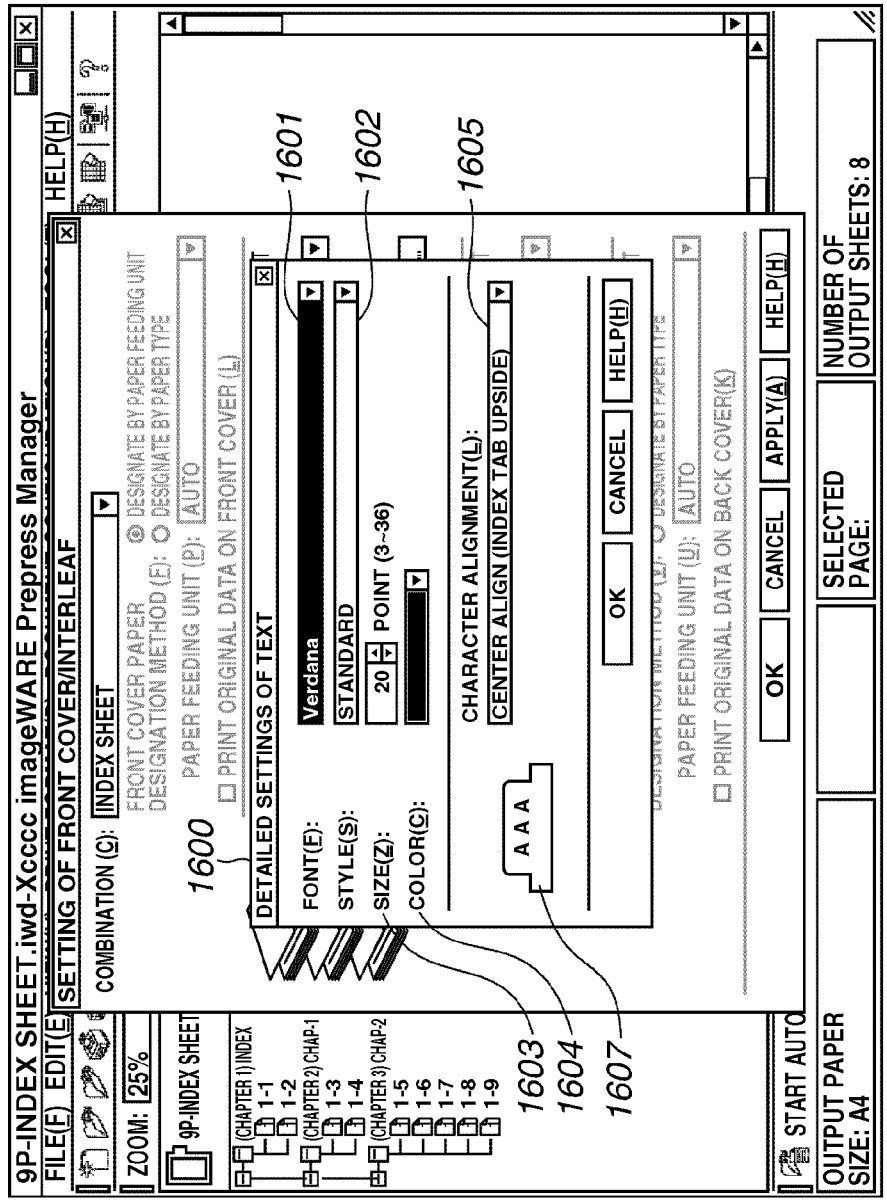
FIG. 16 illustrates an example user interface screen enabling a user to set a character string to be printed on a tab of an index sheet according to an exemplary embodiment of the present invention.

FIG. 16 illustrates an example display of a tab text setting window 1600 opened when a user instructs via a "detailed settings of text" button 1502 illustrated in FIG. 15 which is provided by the bookbinding application 104. The button 1502 is effective when an index sheet is selected as insertion paper.

A user can select a character font and a size of a character string to be printed on a tab portion via the window 1600 illustrated in FIG. 16. A user can select a horizontal writing font or a vertical writing font via a font designation field 1601 on the window illustrated in FIG. 16. A layout designation field 1605 displays a plurality of selection candidates 1606, as shown in FIG. 17, which are automatically changed according to a user's selection (i.e., input via the font designation field 1601).

Figure 17:
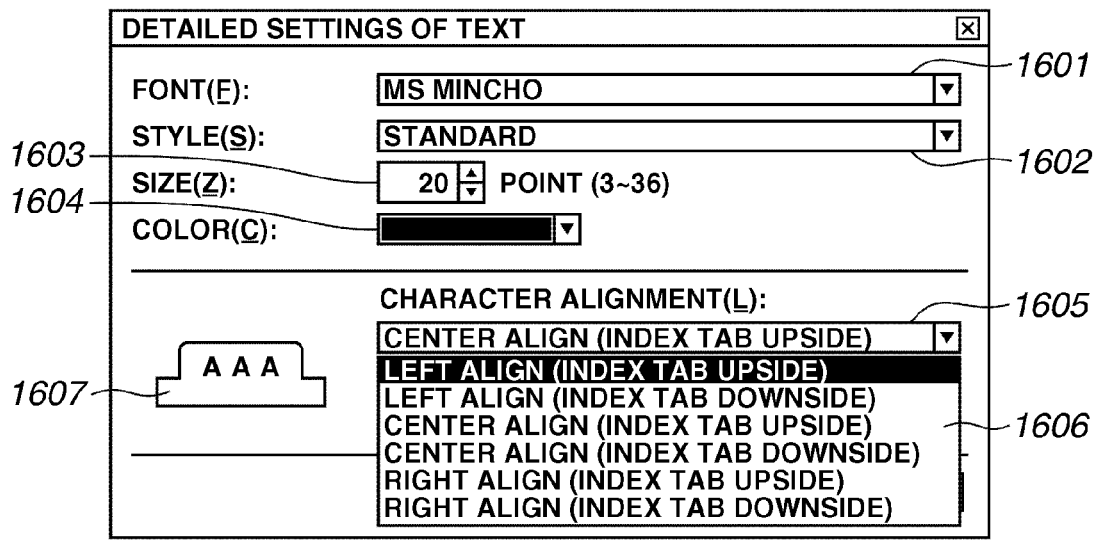
FIG. 17 illustrates an example user interface screen enabling a user to set a character string to be printed on a tab of an index sheet according to an exemplary embodiment of the present invention.
Figure 18:
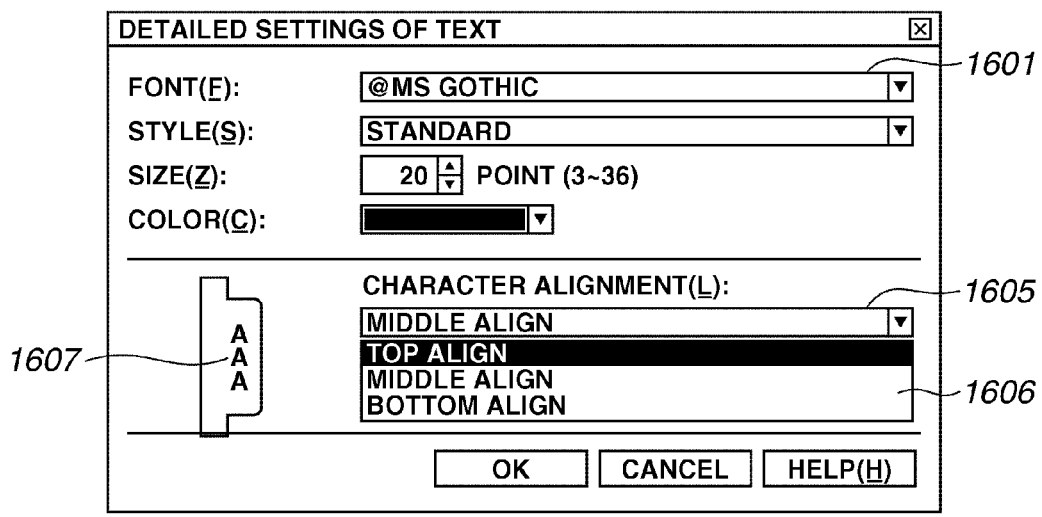
FIG. 18 illustrates an example user interface screen enabling a user to set a character string to be printed on a tab of an index sheet according to an exemplary embodiment of the present invention.

FIG. 17 illustrates a window displayed in response to selection of the horizontal writing font. FIG. 18 illustrates a window displayed in response to selection of the vertical writing font.

The bookbinding application 104 (i.e., a printing control program according to an exemplary embodiment) provides a setting screen illustrated in FIG. 16 and enables a user to easily set a character string to be printed on a tab portion of a tab sheet (index sheet) inserted in a document. This is different from a conventional system that generates data for an index sheet (i.e., data for a document page).

Furthermore, if a user wants to change an insertion position of an index sheet inserted into a document, the user can simply change a page position of an index sheet on a page preview screen provided by the bookbinding application 104.

Therefore, a user can change a page position of a tab sheet with a simple operation. Furthermore, if a user wants to add an index sheet, the user can simply instruct adding of an index sheet. Thus, the user's operability can be greatly improved.

According to the example illustrated in FIG. 17, a horizontal writing font "MS MINCHO" is selected. A user can select a desirable layout (character alignment) among the plurality of selection candidates 1606. If a user selects "left align (index tab upside)" as illustrated in FIG. 17, the bookbinding application 104 instructs a print of a chapter name on a tab sheet with a tab portion disposed at an upper side thereof, using a layout of a character string positioned at a left side of the tab.

If a user selects "left align (index tab downside)", the bookbinding application 104 instructs a print of a chapter name on a tab sheet with a tab portion disposed at a lower side thereof, using a layout of a character string positioned at a left side of the tab.

In this manner, a user can select a desired character alignment including designation of a tab position (upside or downside) of an index sheet, when a horizontal writing font is selected.

The tab text setting window 1600 includes a simplified layout 1607 that illustrates a status of setting contents of the tab text setting window 1600. For example, if a user designates "center align (index tab upside)" in the layout designation field 1605 illustrated in FIG. 16, the bookbinding application 104 displays the simplified layout 1607 indicating a center aligned character string on an upside tab.

Furthermore, the tab text setting window 1600 includes a style designate area 1602 ("standard" according to FIG. 17), a character size setting area 1603 ("20 point" according to FIG. 17), and a character color designation area 1604.

According to the example illustrated in FIG. 18, a vertical writing font "@MS Gothic" is selected in the font designation field 1601. In this case, "top align", "middle align", and "bottom align" are displayed as selection candidates 1606 corresponding to the designated font selected in the font designation field 1601. A user can select a desired layout (character alignment) among the displayed selection candidates.

If a user selects "top align" among the selection candidates 1606 as illustrated in FIG. 18, the indication in the layout designation field 1605 changes from "middle align" to "top align." Furthermore, in FIG. 18, the simplified layout 1607 is an illustration of a chapter name printed on a right-side tab of a tab sheet. The character position (AAA in FIG. 18) can be changed according to the character alignment settings. Furthermore, in FIG. 18, one of "top align", "middle align", and "bottom align" is selectable as a layout of the character string printed on a tab of a tab sheet.

However, if the bookbinding application 104 provides designation fields "open to left" and "open to right" selectable as part of print settings, and if the designated opening direction is "open to left", the bookbinding application 104 displays the selection candidates 1606 illustrated in FIG. 18. If the designated opening direction is "open to right", the bookbinding application 104 can display selection candidates "top align (index tab left side)", "middle align (index tab left side)", and "bottom align (index tab left side)." The layout of "index tab left side" corresponds to a layout of a chapter name printed on a left-side tab of an index sheet.

Figure 38:
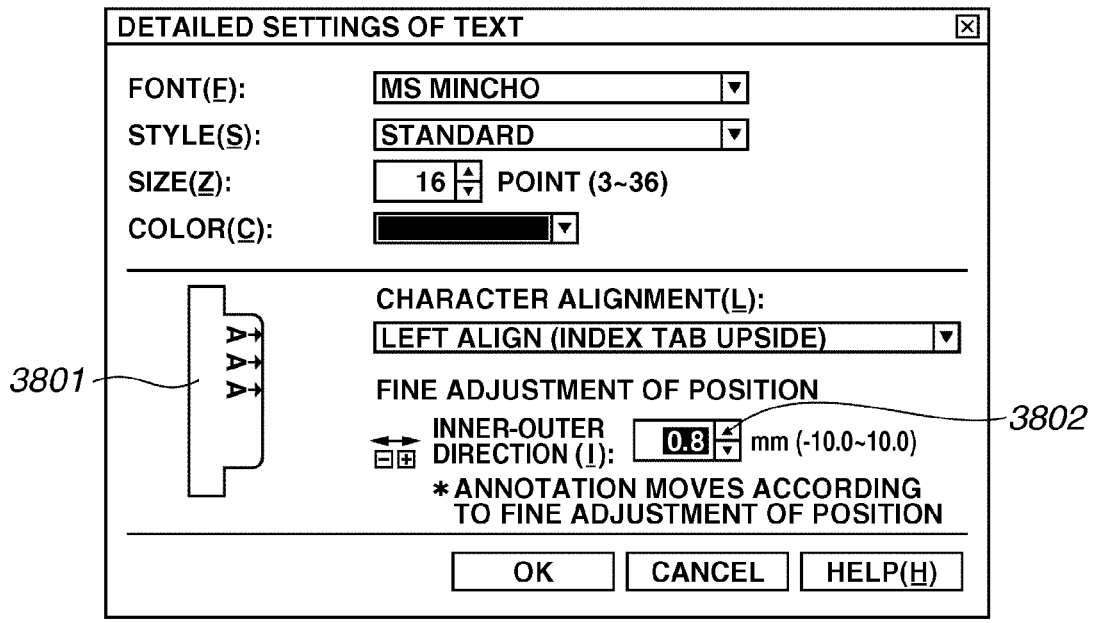
FIG. 38 illustrates an example user interface screen enabling a user to set a character string to be printed on a tab of an index sheet according to an exemplary embodiment of the present invention.

FIG. 38 illustrates an example tab text setting window provided by the bookbinding application 104. The setting window illustrated in FIG. 38 includes an inner-outer direction designation area 3802 that enables a user to adjust the position of a character string printed on a tab portion, in addition to the contents of the above-described window illustrated in FIG. 16.

If a user designates "+0.8 mm" in the inner-outer direction designation area 3802 of FIG. 38, a character string printed on a tab portion is shifted to an outer direction (i.e., a direction toward the tab of an index sheet) by 0.8 mm than a printing position set when the "left align" is designated. Furthermore, a simplified layout 3801 is an illustration of a character string actually printed on a tab (left align according to FIG. 38) including arrows indicating that the print position of the character string shifts to the outer direction (toward the tab of an index sheet).

According to the above-described examples, the processing of the flowchart illustrated in FIG. 14 is described below in detail.

At step S1401, the bookbinding application 104 determines whether a print of a chapter name on a tab is set. More specifically, the bookbinding application 104 executes the processing of step S1401 based on a check status in the check box 1501 illustrated in FIG. 15.

If the bookbinding application 104 determines that the check box 1501 is checked (YES in step S1401), the processing flow proceeds to step S1402. At step S1402, the bookbinding application 104 executes processing for selecting a font of a character string to be printed on a tab portion. At step S1402, the bookbinding application 104 determines whether a vertical writing font is selected via the tab text setting window 1600 illustrated in FIG. 16. As example processing of step S1402, if a "@"-attached font name is selected in the font designation field 1601, the bookbinding application 104 determines that a vertical writing font is selected.

If the bookbinding application 104 determines that a vertical writing font is selected (YES in step S1402), the processing flow proceeds to step S1403. At step S1403, the bookbinding application 104 performs processing for setting a vertical writing tab portion. In the vertical writing tab setting processing, the bookbinding application 104 provides the display screen illustrated in FIG. 18 that enables a user to set character style, character size, character color, and character alignment and, via the OS, controls the display unit 210 to display the screen illustrated in FIG. 18. As described above, the bookbinding application 104 can further determine whether the opening direction is "open to right" or "open to left" and can change the candidates of the layout applied to a tab of an index sheet according to the opening direction.

If the bookbinding application 104 determines that a horizontal writing font is selected (i.e., NO in step S1402), the processing flow proceeds to step S1404. At step S1404, the bookbinding application 104 performs processing for setting a horizontal writing tab portion. In the horizontal writing tab setting processing, the bookbinding application 104 provides the display screen illustrated in FIG. 17 that enables a user to set character style, character size, character color, character alignment, and fine adjustment of position.

Figure 19:
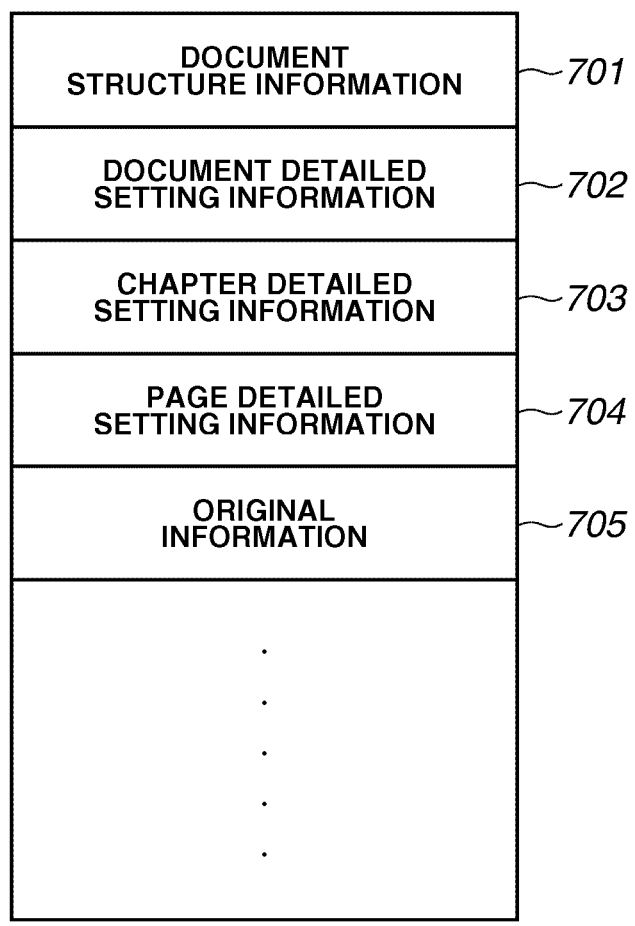
FIG. 19 illustrates an example data structure of a document file according to an exemplary embodiment of the present invention.

FIG. 19 illustrates an example data structure of a document file that the general application 101 can process. The document file corresponds to the electronic original file 103 illustrated in FIG. 1 and is, for example, stored in the external memory 211 illustrated in FIG. 13 or in the database 1211 of the document management server 1201 illustrated in FIG. 12.

In FIG. 19, a "document structure information" area 701 stores information relating to a document structure displayed in the tree view section 1101 of the application operation screen illustrated in FIG. 10. A "document detailed setting information" area 702 stores information settable for the whole of a document. A "chapter detailed setting information" area 703 stores information settable for each chapter.

A "page detailed setting information" area 704 stores information settable for each page. An "original information" area 705 stores drawing information of each original page, i.e., information used for the display in the print preview 1102 illustrated in FIG. 10, on a page-by-page basis. The document file also includes information required for each document, although not described.

Figure 20:
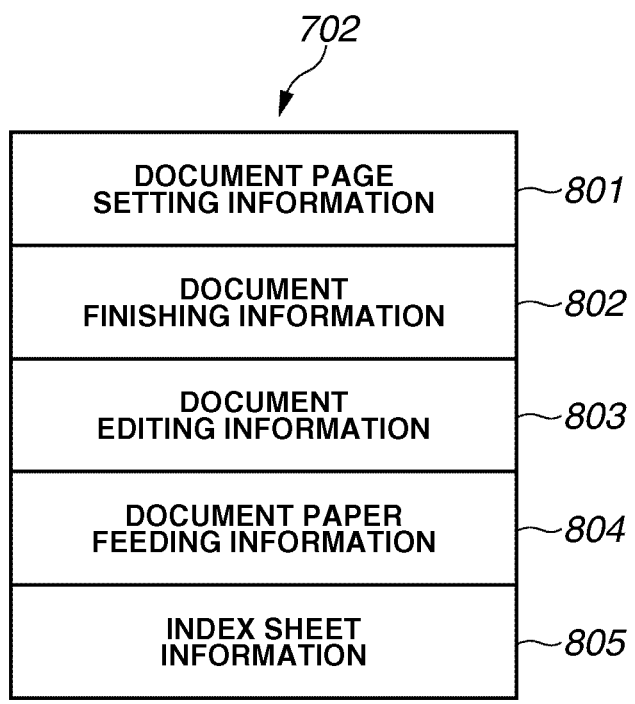
FIG. 20 illustrates an example data structure of document detailed setting information according to an exemplary embodiment of the present invention.

FIG. 20 illustrates a detailed data structure of the "document detailed setting information" area 702 illustrated in FIG. 19.

The "document detailed setting information" area 702 includes a "document page setting information" area 801, a "document finishing information" area 802, a "document editing information" area 803, a "document paper feeding information" area 804, and an "index sheet information" area 805.

If a user performs index sheet settings via the operation screen illustrated in FIG. 15, the setting information is added to the "index sheet information" area 805.

Figure 21:
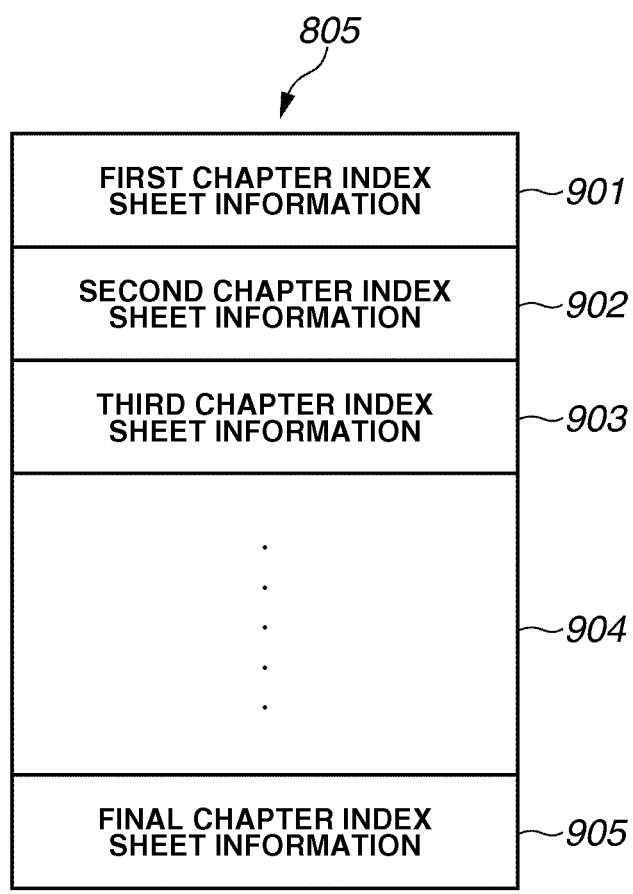
FIG. 21 illustrates index sheet information of each chapter according to an exemplary embodiment of the present invention.

FIG. 21 illustrates detailed information stored in the "index sheet information" area 805 illustrated in FIG. 20.

The index sheet information illustrated in FIG. 21 includes first chapter index sheet information 901, second chapter index sheet information 902 . . . , and final chapter index sheet information 905 which are serially disposed. For example, if a user sets the usage of index sheet as illustrated in FIG. 15, an index sheet is inserted to the head of each chapter. In this case, the number of secured index sheet information is equal to the total number of chapters. The information relating to the index sheet set by a user via the screens illustrated in FIGS. 15 to 18 are stored in the index sheet information (901 to 905) illustrated in FIG. 21.

FIG. 22 illustrates a detailed data structure of the "chapter detailed setting information" area 703 illustrated in FIG. 19.

The "chapter detailed setting information" area 703 includes first chapter detailed setting information 1001, second chapter detailed setting information 1002 . . . , final chapter detailed setting information 1005. The above-described chapter name (e.g., a file name of an imported file or a chapter name changed by a user) printed on a tab portion of an index sheet is stored in each chapter detailed setting information.

Figure 23:
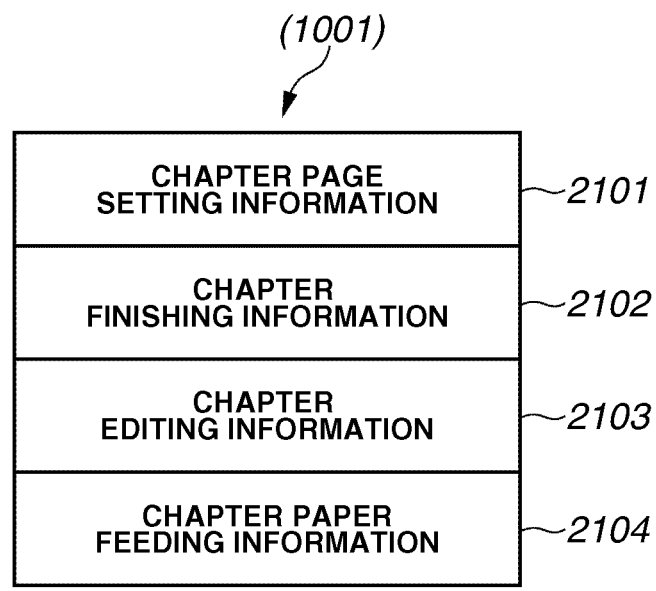
FIG. 23 illustrates an example data structure of page setting information of each chapter according to an exemplary embodiment of the present invention.

FIG. 23 illustrates an example data structure of detailed setting information (1001 to 1005) of each chapter illustrated in FIG. 22.

The chapter detailed setting information 1001 illustrated in FIG. 23 includes chapter page setting information 2101 (in which a chapter name is stored), chapter finishing information 2102, chapter editing information 2103, and chapter paper feeding information 2104.

Figure 24:
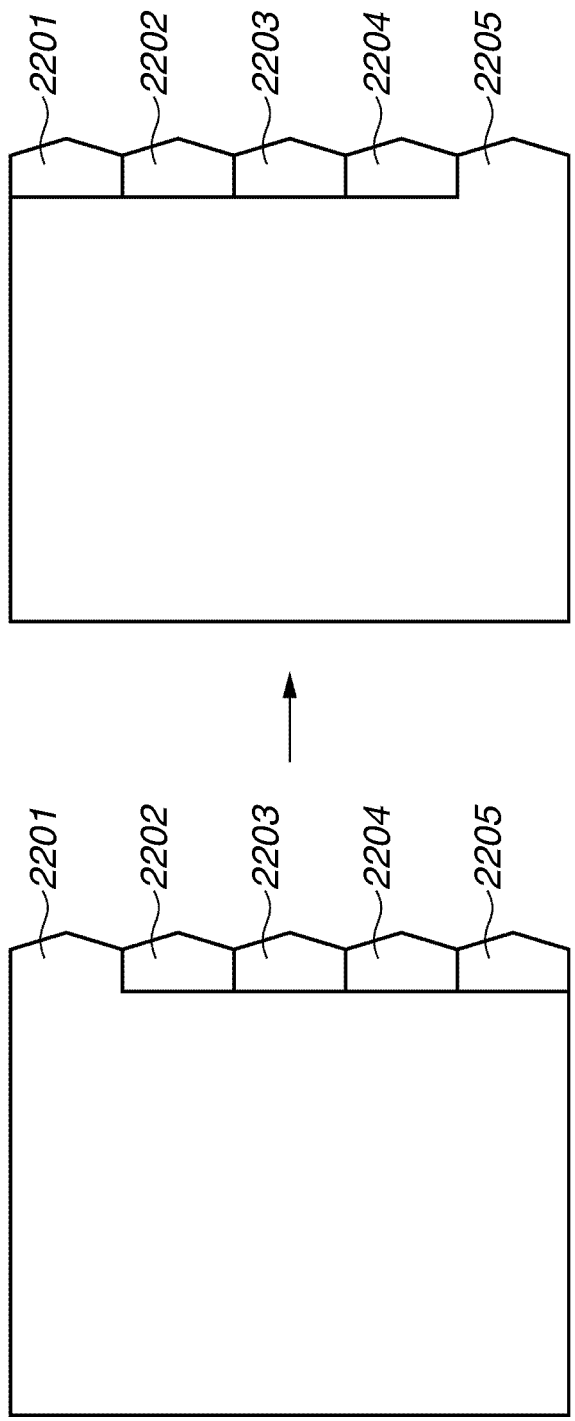
FIG. 24 illustrates an example image displayed when tab information of an index sheet is edited according to an exemplary embodiment of the present invention.

FIG. 24 illustrates an example image displayed on the display unit when the bookbinding application 104 performs detailed editing of index sheets.

The editing screen displays a plurality of index sheets (five sheets according to the example illustrated in FIG. 24) which are stacked. If a user designates a tab of an index sheet as object to be edited, for example, using a mouse (i.e., a pointing device), the instructed index sheet is displayed as top page so that a user can edit the instructed index sheet.

For example, in an initial state illustrated in FIG. 24, a tab sheet 2201 of the head chapter is positioned as the top page. Next, if a user clicks on a tab sheet 2205, the tab sheet 2205 is displayed as the top page so that a user can edit the tab sheet 2205 (index sheet). In this manner, a user can edit the contents of any designated index sheet and its tab sheet which are displayed as the top page.

Figure 25:
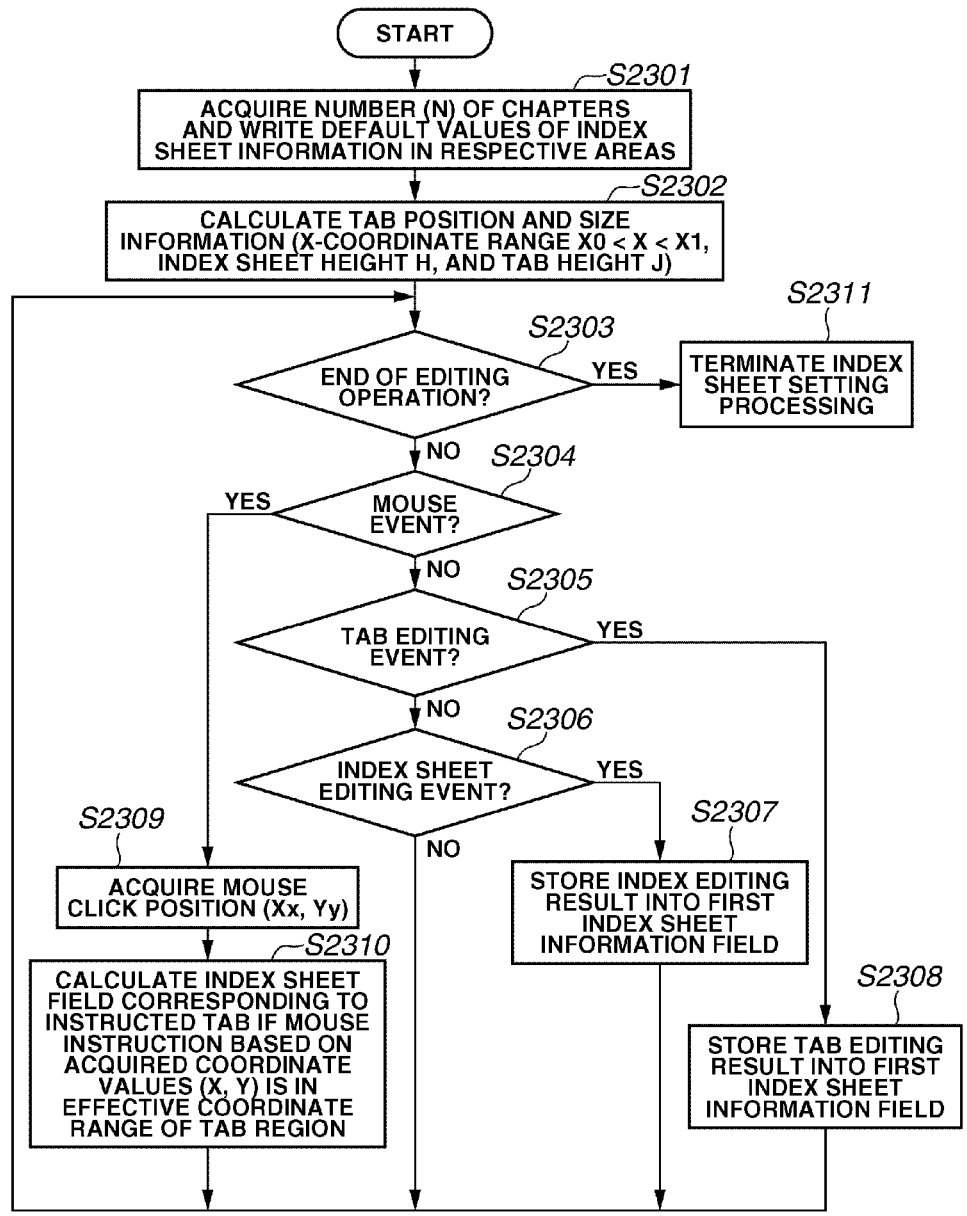
FIG. 25 is a flowchart illustrating example processing for editing index sheet information and controlling a preview display according to an exemplary embodiment of the present invention.

FIG. 25 is a flowchart illustrating exemplary index sheet setting and preview display processing performed by the bookbinding application 104 according to an exemplary embodiment.

If a user performs index sheet settings via the setting dialog illustrated in FIG. 15, index information fields corresponding to the number of chapters included in document are prepared as illustrated in FIG. 21.

Therefore, at step S2301, the bookbinding application 104 prepares chapter index sheet information fields corresponding to the number (N) of the chapters as illustrated in FIG. 21 for the "index sheet information" area 805, and writes default values of index sheet information in respective areas.

At step S2302, the bookbinding application 104 calculates position and size information relating to a tab region of an index sheet. For example, when an origin (coordinate values (X0, Y0)) is set at a top-right position of an index sheet, the bookbinding application 104 calculates an X-coordinate range X0<X<X1 of a tab position, an index sheet height H, and a tab height J.

At step S2303, the bookbinding application 104 determines whether a user's editing operation has been completed. As example processing of step S2303, the bookbinding application 104 can determine whether a user has pressed an "OK" button on a tab sheet editing screen.

If any event is generated by a user's editing operation, the bookbinding application 104 performs processing corresponding to the generated event. More specifically, at step S2304, the bookbinding application 104 determines whether a user clicks on an index sheet with a mouse (i.e., determines whether a mouse event is generated) to select an index sheet to be edited. If the bookbinding application 104 determines that a mouse event is generated (YES in step 2304), the processing flow proceeds to step S2309. At step S2309, the bookbinding application 104 reads coordinate values (Xx, Yy) of a mouse cursor.

At step S2310, the bookbinding application 104 converts the coordinate values (Xx, Yy) acquired by the processing of step S2309 into coordinate values (X, Y) relative to the origin coordinate values (X0, Y0) corresponding to the top-right position of an index sheet. Then, the bookbinding application 104 confirms whether an effective coordinate range of the tab region is instructed by the mouse, based on the converted coordinate values (X, Y). If the converted coordinate values (X, Y) satisfy X0<X<X1 and Y0<Y<(Y0+H), it means that any one of the index sheet tabs is instructed by the mouse cursor. Thus, the bookbinding application 104 identifies an index sheet corresponding to the instructed tab.

In this embodiment, if the number of the head index sheet is "0", the bookbinding application 104 can identify the instructed index sheet by obtaining an integer portion of {(Y−Y0)/J}. Namely, this number is a chapter number corresponding to an area of the editing information, i.e., a storage area of the index sheet information illustrated in FIG. 21.

If the bookbinding application 104 determines that a mouse event is not generated (NO in step S2304), the processing flow proceeds to step S2305. At step S2305, the bookbinding application 104 determines whether a tab editing event is generated. If the bookbinding application 104 determines that a tab editing event is generated (YES in step S2305), the processing flow proceeds to step S2308.

At step S2308, the bookbinding application 104 displays the editing screen (FIG. 16) to enable a user to determine a font and a size of a chapter name printed on a tab of an index sheet. Then, the character style set by a user via this screen is stored in the index sheet information field (FIG. 21) of a chapter instructed by the chapter number obtained by the processing of step 2310. The flowchart illustrated in FIG. 14 describes detailed processing of the step S2308.

If the bookbinding application 104 determines that a tab editing event is not generated (NO in step S2305), the processing flow proceeds to step S2306. At step S2306, the bookbinding application 104 determines whether an index sheet editing event is generated. If the bookbinding application 104 determines that an index sheet editing event is generated (YES in step S2306), the processing flow proceeds to step S2307.

At step S2307, the bookbinding application 104 displays an index sheet editing screen (e.g., FIG. 15). Then, the bookbinding application 104 stores the information edited by the processing of step S2307 into the index sheet information field (FIG. 21) corresponding to the chapter number obtained by the processing of step 2310.

If the bookbinding application 104 determines that an editing termination event is generated (YES in step S2303), the processing flow proceeds to step S2311. At step S2311, the bookbinding application 104 terminates the index sheet setting processing with the information edited by the above-described operations.

Figure 26:
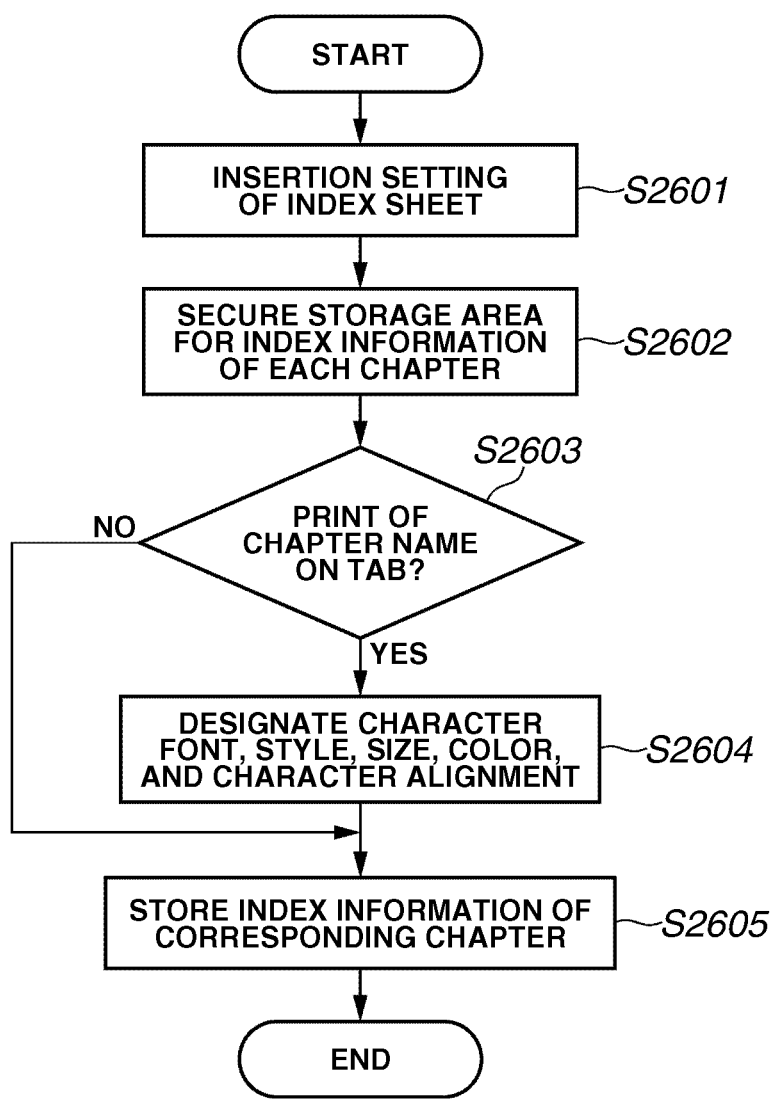
FIG. 26 is a flowchart illustrating example index sheet setting processing according to an exemplary embodiment of the present invention.

FIG. 26 is a flowchart illustrating details of the above-described index sheet information input processing.

At step S2601, the bookbinding application 104 starts the index sheet setting processing in response to a user's instructions via the screen illustrated in FIG. 15.

At step S2602, the bookbinding application 104 prepares index sheet information storage areas (FIG. 21) corresponding to the number of required chapters based on the number of index sheets having been set. For example, the number of index sheets can be determined based on the contents of the "pattern" designation area 1504 in FIG. 15. For example, as illustrated in FIG. 15, if "5-ridge" is set, the number of index sheets is 5.

At step S2603, the bookbinding application 104 determines whether the print of a chapter name on an index tab portion is instructed in the check box 1501. If the bookbinding application 104 determines that the printing is instructed (YES in step S2603), the processing flow proceeds to step S2604.

At step S2604, the bookbinding application 104 designates character font, style, size, color, and character alignment for the characters used for a tab print according to user's instructions. The settings of a character string to be printed on a tab performed by a user correspond to the processing described with reference to FIGS. 16 through 18.

At step S2605, the bookbinding application 104 stores the index sheet information (a character string printed on a tab portion, an annotation printed on an index sheet, etc.) as index sheet information of the corresponding chapter, together with tab information previously set. The tab information includes a font and a size of a character string printed on a tab.

If the bookbinding application 104 determines that the printing is not instructed (NO in step S2603), the processing flow proceeds to step S2605 to perform the above-described processing.

Figure 27:
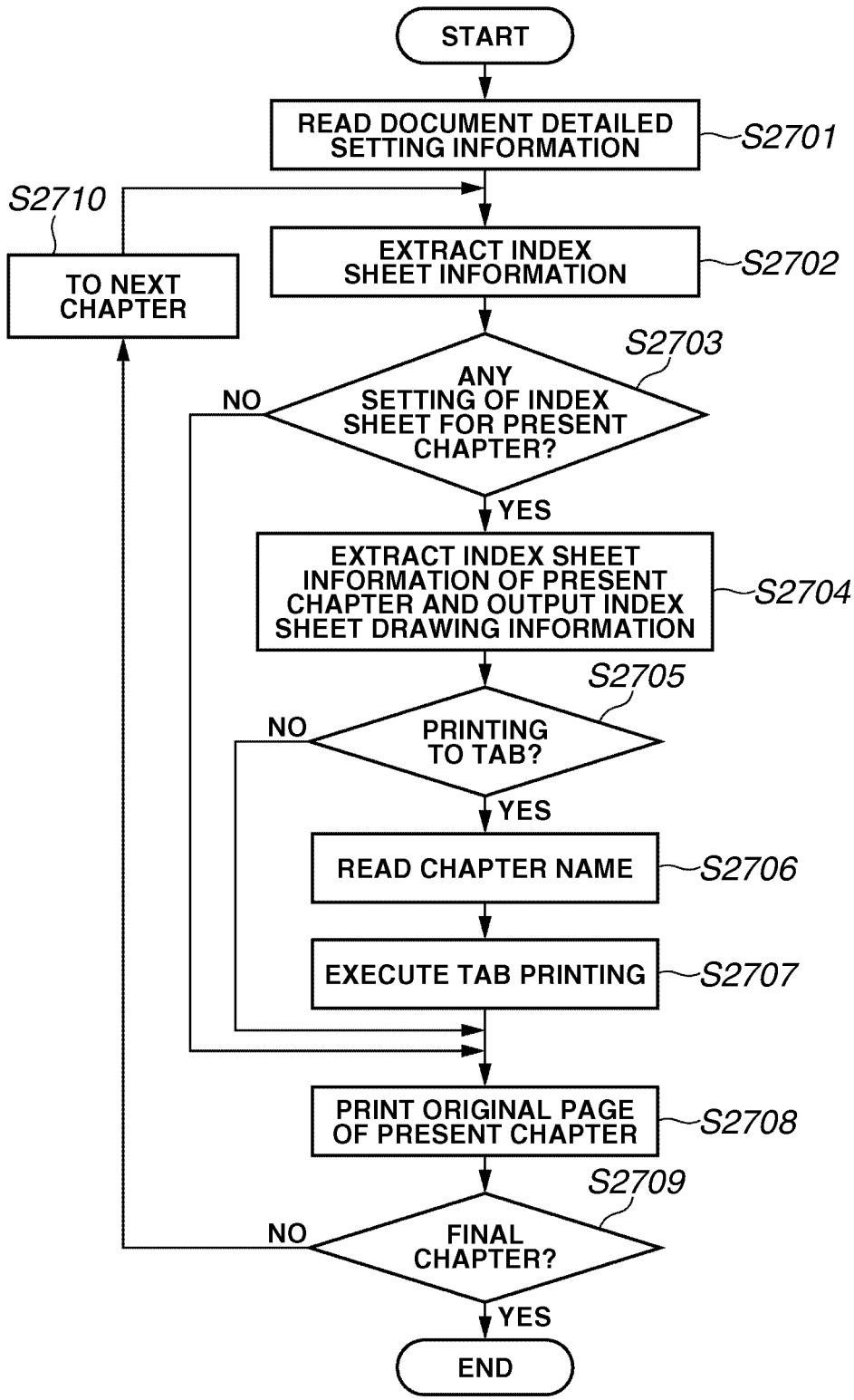
FIG. 27 is a flowchart illustrating example processing for printing document information including an index sheet according to an exemplary embodiment of the present invention.

FIG. 27 is a flowchart illustrating example document information print processing according to an exemplary embodiment.

At step S2701, the electronic original despooler 105 reads the document detailed setting information from the area 702 illustrated in FIG. 19. At step S2702, the electronic original despooler 105 extracts the index sheet information from the area 805 (FIG. 20), which is part of the detailed setting information. At step S2703, the electronic original despooler 105 determines whether index sheet information is set for the present chapter, based on the index sheet information extracted from the area 805 (FIG. 21).

If the electronic original despooler 105 determines that index sheet information is set for the chapter (present object) (YES in step S2703), the processing flow proceeds to step S2704. At step S2704, the electronic original despooler 105 extracts the index sheet information of this chapter and outputs index sheet drawing information. An example of the index sheet information is annotation.

At step S2705, the electronic original despooler 105 determines whether the printing to a tab of an index sheet is instructed. For example, the electronic original despooler 105 performs the determination processing of step S2705 by referring to the index sheet information illustrated in FIG. 21.

If the electronic original despooler 105 determines that the printing to a tab portion is instructed (YES in step S2705), the processing flow proceeds to step S2706. At step S2706, the electronic original despooler 105 reads a chapter name (i.e., a present object) from the chapter detailed setting information illustrated in FIG. 22.

At step S2707, the electronic original despooler 105 outputs a GDI function so that a character string is printed on a tab of an index sheet according to the font or the character size stored as chapter index sheet information of the present object. The output destination in step S2707 is a graphic engine (GDI) functioning as a drawing unit of the OS.

Thus, the graphic engine converts the GDI function into a drawing function (DDI function) interpretable by the printer driver 106. Then, the printer driver 106 generates print data of a printer control language interpretable by the printer 107 according to the drawing function (DDI function) transmitted from the graphic engine. The printer 107 executes tab sheet print processing.

If the electronic original despooler 105 determines that index sheet information is not set for the chapter (present object) (NO instep S2703), the processing flow proceeds to step S2708. If the electronic original despooler 105 determines that the printing to a tab is not instructed (NO in step S2705), the processing flow proceeds to step S2708.

At step S2708, the electronic original despooler 105 outputs a GDI function for printing original pages of this chapter. After completing the print processing for all original pages of the chapter (present object), the processing flow proceeds to step S2709.

At step S2709, the electronic original despooler 105 determines whether the chapter (present object) is a final chapter. If the electronic original despooler 105 determines that the chapter (present object) is not a final chapter (NO in step S2709), the processing flow proceeds to step S2710. At step S2710, the electronic original despooler 105 designates the next chapter as present object. Then, the processing flow returns to step S2702.

If the print processing for all original pages of all chapters of the document and index sheets is completed, the electronic original despooler 105 terminates the print processing.

When the electronic original despooler 105 displays a print preview of the document information, the flowchart illustrated in FIG. 27 can be modified by replacing "print" with "display a print preview" so as to realize a print preview display of a set index sheet and each original page.

As described above, the electronic original despooler 105 functions as an output unit that outputs drawing data based on a font and a character size set by a user. In the above-described embodiment, each processing of the flowchart (i.e., processing performed by the electronic original despooler 105) can be executed by the bookbinding application 104 if the electronic original despooler is involved in the bookbinding application 104.

Figure 28:
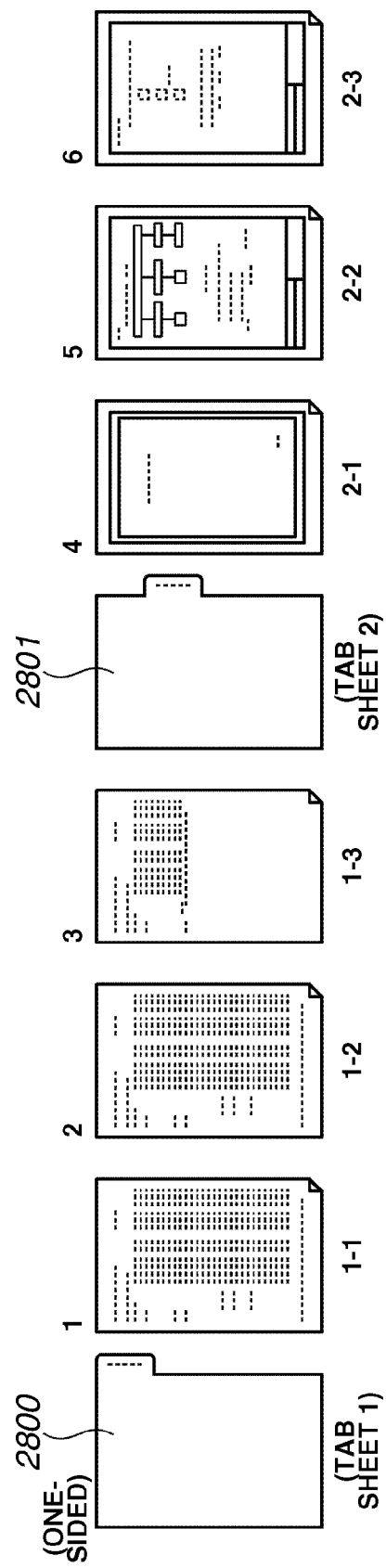
FIG. 28 illustrates an example preview display of original pages and index sheets resulting from index sheet settings and tab print settings according to an exemplary embodiment of the present invention.

FIG. 28 illustrates an example print preview 1102 displayed according to the processing illustrated in FIG. 27.

In FIG. 28, the print preview 1102 includes index sheets 2800 and 2801, each leading chapters. The index sheets 2800 and 2801 have a tab portion on which a character string is displayed according to user's settings (e.g., character size, character font, and character alignment). Thus, a user can easily determine the position of each index sheet inserted between pages. Furthermore, a user can recognize the entire shape of each index sheet because displayed sheets are sequentially aligned without any overlap between neighboring pages.

According to the above-described processing, a character string can be printed on a tab of an index sheet according to the information (font, size, etc.) designated by a user via the window illustrated in FIG. 16.

The tab printing performed in step S2707 illustrated in FIG. 27 is print processing applied to a layout pattern of index sheets illustrated in FIG. 39, according to which tabs of index sheets are regularly aligned without any clearance and each tab has a size (height) equivalent to a value obtained by uniformly dividing a long side of a sheet by the number of tab ridges.

Therefore, if the print processing illustrated in FIG. 27 is simply applied to an index sheet having a tab shape or a tab position different from the pattern illustrated in FIG. 39, a character string may not be printed on a designated tab.

To solve this problem, example processing for printing character strings on index sheets having various patterns is described below. In FIG. 39, a dotted line displayed along a long side of the first index sheet indicates tab positions of second and third tab sheets positioned when three index sheets are stacked. The same explanation is applied to the illustrations of FIGS. 40 to 42.

If index sheets have various patterns, a user is required to designate a tab shape and a tab layout of each index sheet.

Figure 29:
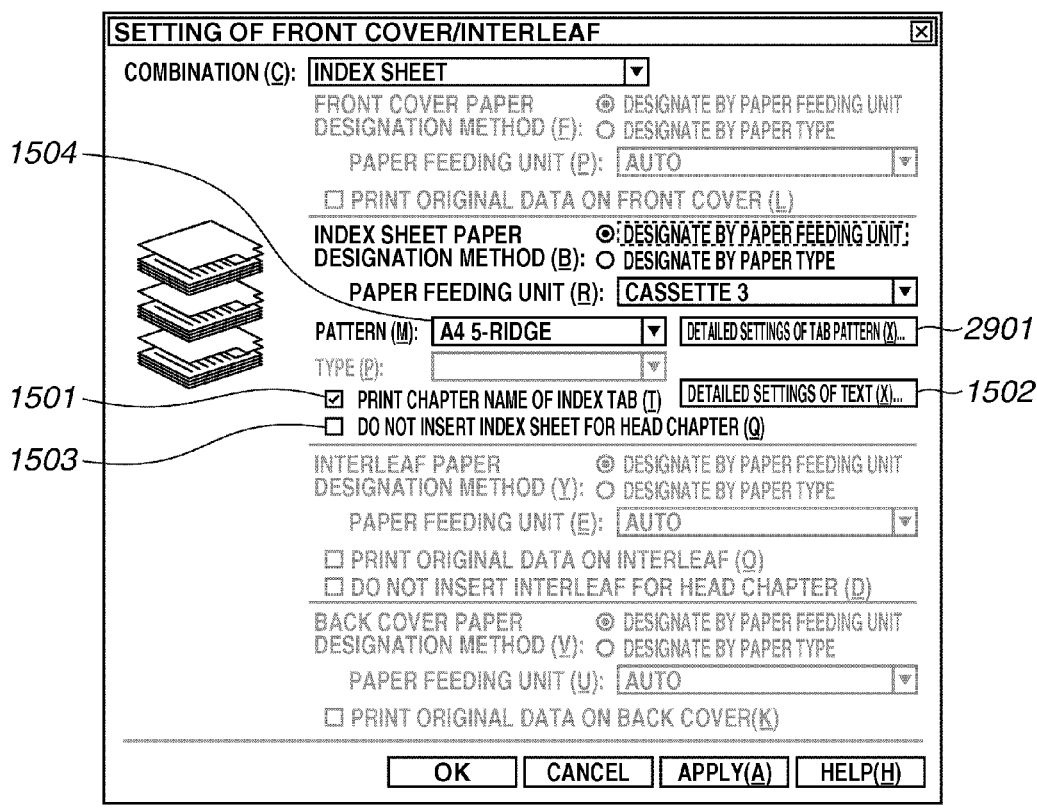
FIG. 29 illustrates an example user interface screen enabling a user to set a character string on a tab of an index sheet, which includes a tab pattern detailed setting button, according to an exemplary embodiment of the present invention.

FIG. 29 illustrates a modified window similar to that illustrated in FIG. 15. FIG. 29 includes a "detailed settings of tab pattern" button 2901 which is not illustrated in FIG. 15.

Figure 30:
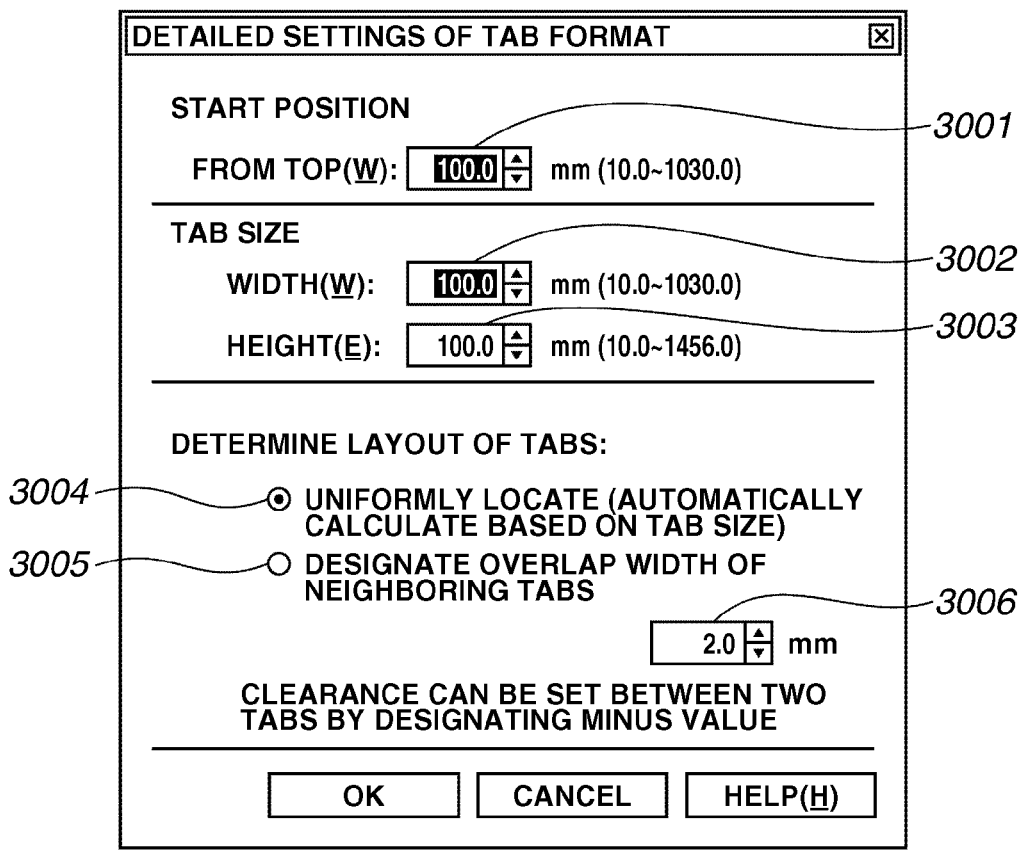
FIG. 30 illustrates an example user interface screen enabling a user to set a method for performing a print on a tab of an index sheet according to an exemplary embodiment of the present invention.

FIG. 30 is a tab setting window enabling a user to instruct pattern of tab, position of tab, and tab printing method, which opens when a user clicks on the "detailed settings of tab pattern" button 2901 illustrated in FIG. 29.

A user can designate tab start position (3001), size of tab portion (width 3002 and height 3003), and layout of tab (3004 or 3005) relative to an index sheet via the tab setting window illustrated in FIG. 30. The tab start position 3001 represents a distance from the top edge of an index sheet to the top edge of a first tab.

Figure 40:
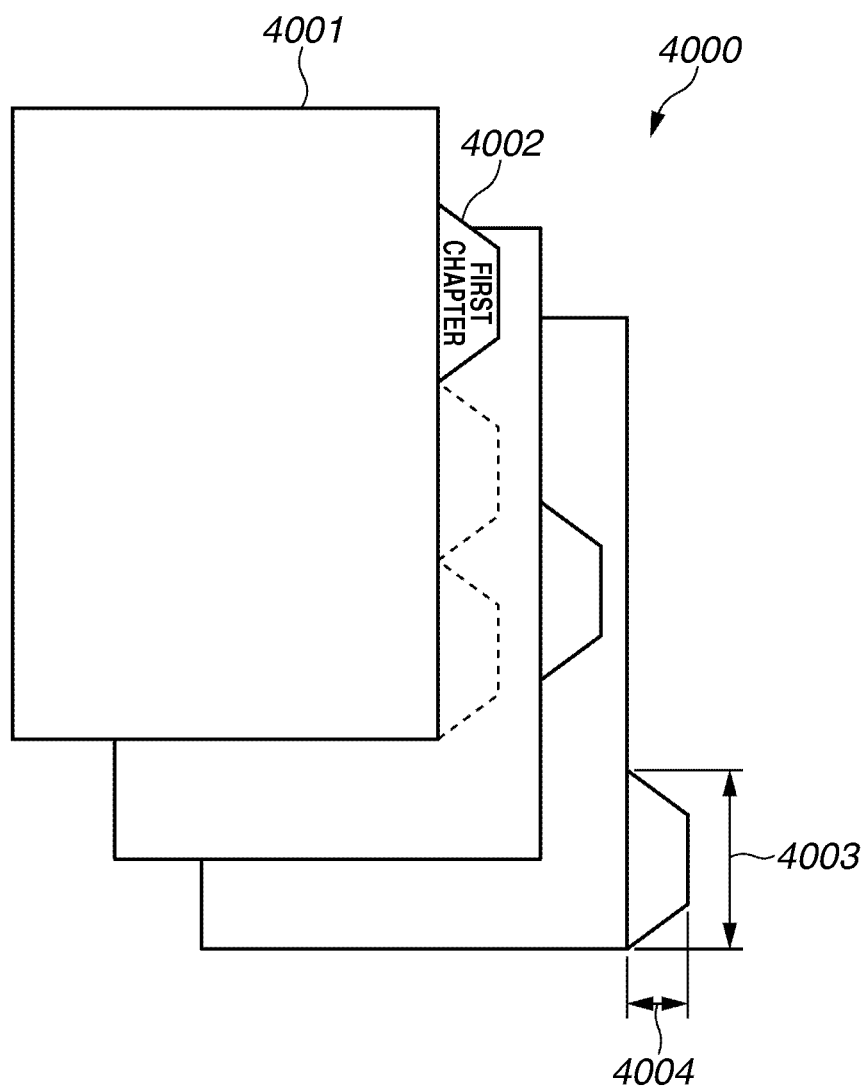
FIG. 40 illustrates example index sheets according to an exemplary embodiment of the present invention.

If a user designates a value of "tab start position" 3001 which is equal to or greater than 0 via the window illustrated in FIG. 30, the bookbinding application 104 performs print processing on a set of index sheets illustrated in FIG. 40 according to which a first tab 4002 is spaced from a top edge 4001 of an index sheet by the distance equal to the value set in the "tab start position" 3001.

If a user sets the tab width 3002 and the tab height 3003 via the window illustrated in FIG. 30, the bookbinding application 104 performs print processing on a set of index sheets illustrated in FIG. 40 according to which a tab has a height 4003 and a width 4004.

Furthermore, if a user turns the "uniform division layout" radio button 3004 on, the bookbinding application 104 performs print processing on a set of index sheets having tab portions disposed with no space between (i.e., having a tab size equivalent to a value obtained by uniformly dividing a long side of an index sheet by the number of tab ridges), based on the size of the index sheet and the number of tabs set by a user via the "pattern" designation area 1504 illustrated in FIG. 29.

For example, three index sheets 4000 illustrated in FIG. 40 have tab portions disposed close without any clearance or overlap. Therefore, if a user turns the "uniform division layout" button 3004 on, the values set in the tab sizes 3002 and 3003 illustrated in FIG. 30 become invalid.

If a user turns the "designate overlap width of neighboring tabs" button 3005 on, the user can designate a desirable value in an "overlap width" designation edit box 3006. If a user designates a value greater than 0, the bookbinding application 104 performs print processing on a set of index sheets having tab portions mutually overlapped.

Figure 41:
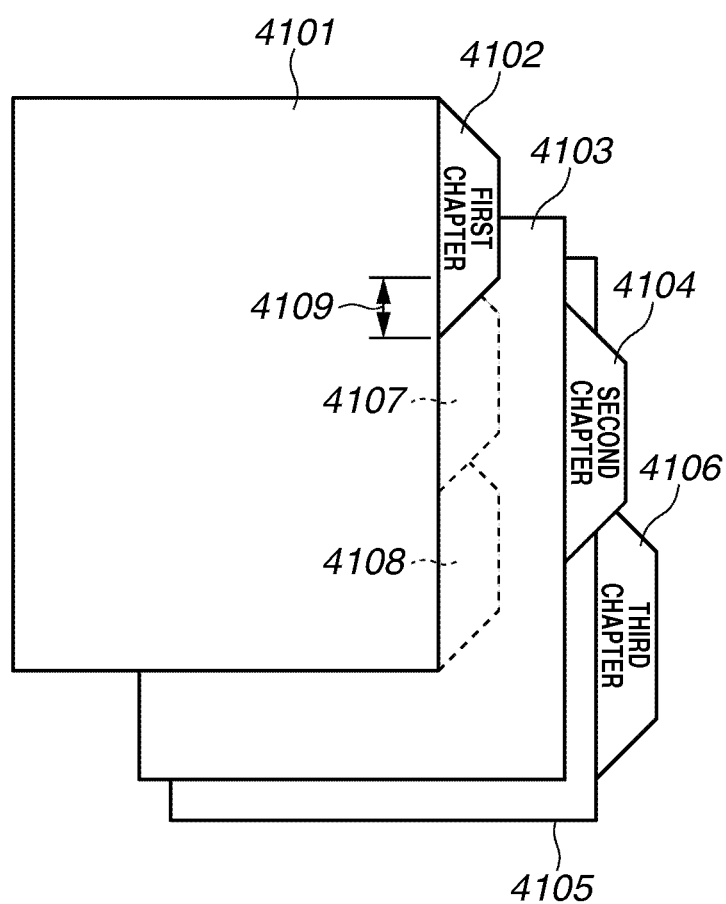
FIG. 41 illustrates example index sheets according to an exemplary embodiment of the present invention.

For example, according to a set of three index sheets illustrated in FIG. 41, a tab 4102 of the first index sheet 4101 is overlapped with a tab 4104 of the second index sheet 4103. Furthermore, the tab 4104 of the second index sheet 4103 is overlapped with a tab 4106 of the third index sheet 4105. In this case, an overlap width 4109 between the first tab 4102 and the second tab 4104 is equal to the value in the "overlap width" designation edit box 3006 set by a user via the window illustrated in FIG. 30. A dotted line displayed along a long side of the first index sheet illustrated in FIG. 41 indicates tab positions 4107 and 4108 of the second and third index sheets.

Figure 42:
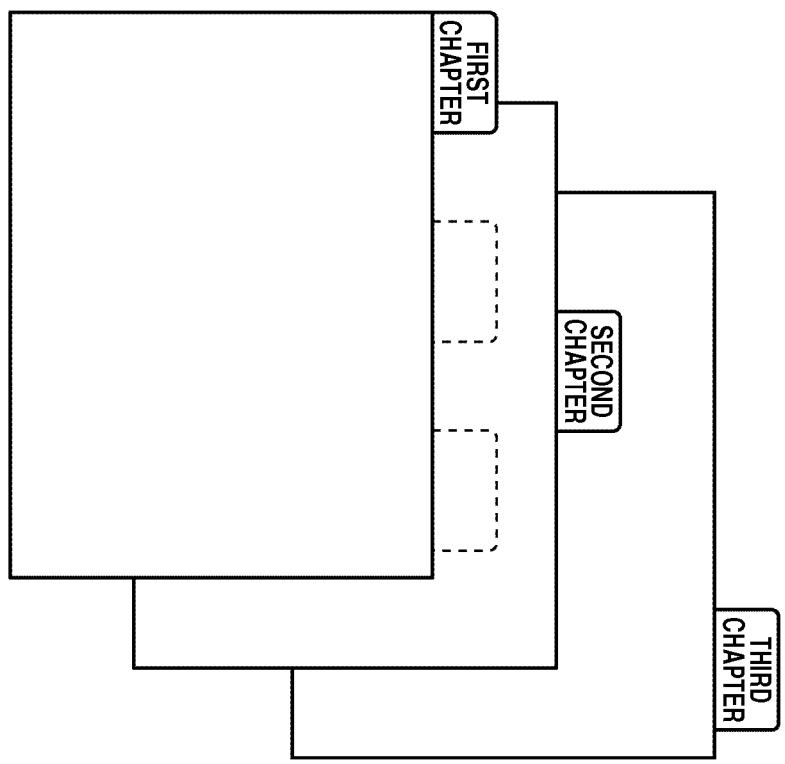
FIG. 42 illustrates example index sheets according to an exemplary embodiment of the present invention.

If a user designates a value less than 0 in the "overlap width" designation edit box 3006, the bookbinding application 104 performs print processing on a set of index sheets illustrated in FIG. 42 according to which tab portions are spaced from each other.

As described above, if a user sets a desirable tab pattern (e.g., the pattern of overlapped tab sheets illustrated in FIG. 41 or the pattern of spaced tab sheets illustrated in FIG. 42) via the window illustrated in FIG. 30, the bookbinding application 104 can accurately print a character string on each tab. Namely, the bookbinding application 104 sets information, for example, for identifying a positional relationship between the tab portion of the first tab sheet and the tab portion of the second tab sheet according to instructions input by a user via the screen illustrated in FIG. 30.

Figure 31:
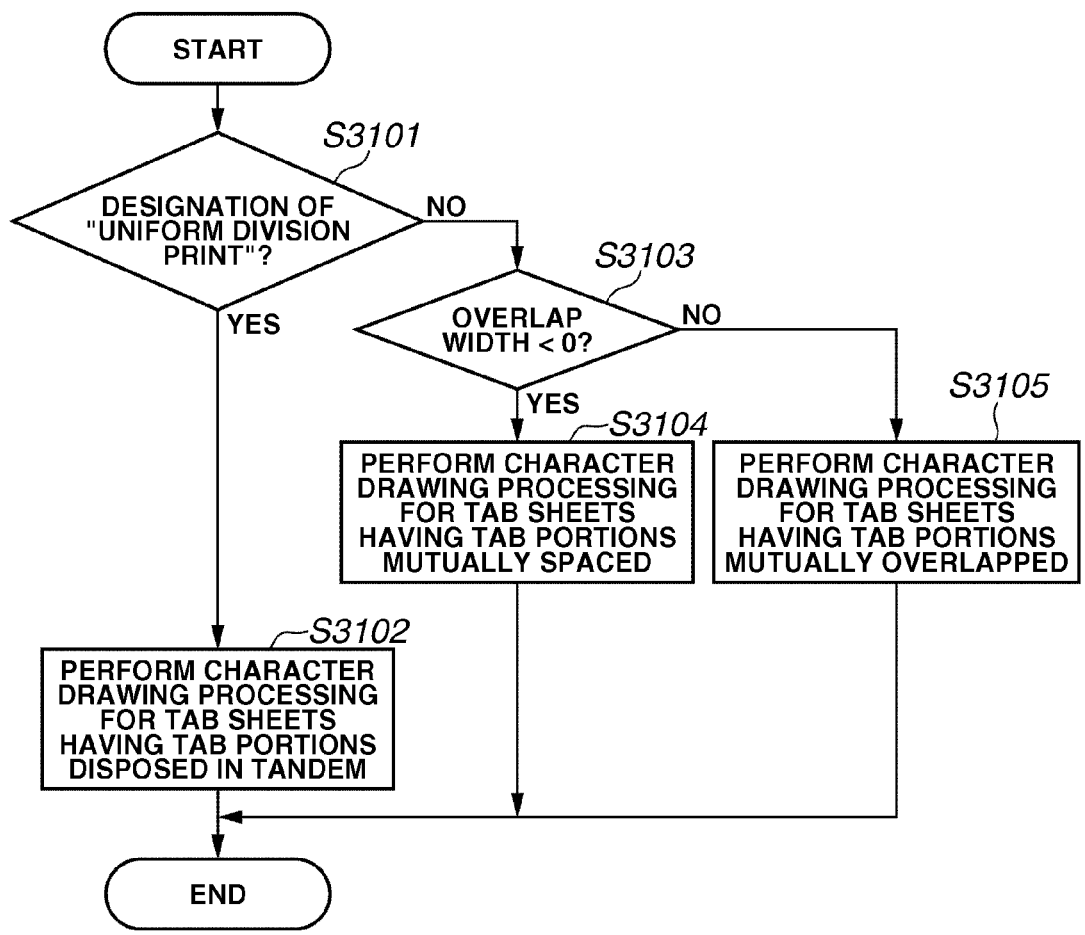
FIG. 31 is a flowchart illustrating example processing for printing index sheets according to an exemplary embodiment of the present invention.

FIG. 31 is a flowchart illustrating example processing for adjusting a tab print position considering a tab pattern according to an exemplary embodiment. This processing is described below in detail with reference to FIG. 30.

At step S3101, the electronic original despooler 105 determines whether the "uniform division layout" radio button 3004 is in an ON state. If the electronic original despooler 105 determines that the "uniform division layout" radio button 3004 is in an ON state (YES in step S3101), the processing flow proceeds to step S3102. At step S3102, the electronic original despooler 105 performs print processing of step S2707 illustrated in FIG. 27. Namely, the electronic original despooler 105 acquires a book file (i.e., drawing data) generated by the bookbinding application 104 and outputs drawing information (GDI function).

If the electronic original despooler 105 determines that the "uniform division layout" radio button 3004 is in an OFF state (NO in step S3101), the processing flow proceeds to step S3103. At step S3103, the electronic original despooler 105 determines whether a value designated in the "overlap width" designation edit box 3006 is less than 0.

If the electronic original despooler 105 determines that the designated overlap value is less than 0 (YES in step S3103), the processing flow proceeds to step S3104. At step S3104, the electronic original despooler 105 outputs drawing information (GDI function) for printing a designated character string on a tab portion considering a clearance width (i.e., a minus value) designated in the "overlap width" designation edit box 3006.

Namely, the electronic original despooler 105 determines a print start position of a character string to be printed on a tab portion based on the alignment direction of the character string set via the window illustrated in FIG. 16, the tab size set via the window illustrated in FIG. 30, and the designated clearance between the tab of the first tab sheet and the tab of the second tab sheet. Therefore, the electronic original despooler 105 can perform accurate printing of a character string at a designated position on each tab even if a clearance is present between tabs of index sheets as illustrated in FIG. 42.

If the electronic original despooler 105 determines that the designated overlap value is equal to or greater than 0 (NO in step S3103), the processing flow proceeds to step S3105. At step S3105, the electronic original despooler 105 outputs drawing information (GDI function) for printing a designated character string on a tab portion considering an overlap width between the tabs of target and next index sheets.

More specifically, at step S3105, the electronic original despooler 105 determines a print start position of a character string to be printed on a tab portion based on the alignment direction of the character string set via the window illustrated in FIG. 16, the tab size set via the window illustrated in FIG. 30, and the designated overlap width. Therefore, the electronic original despooler 105 can perform accurate printing of a character string at a designated position on each tab even if an overlap is present between tabs of index sheets as illustrated in FIG. 41.

Namely, the electronic original despooler 105 determines a print start position of a character string to be printed on each tab portion with reference to the information identifying the positional relationship between tab portions of two or more tab sheets which can be set by a user via the window illustrated in FIG. 30 (steps S3104 and S3105).

Furthermore, if a user sets a distance (3001) from the edge of a printing paper via the window illustrated in FIG. 30, the electronic original despooler 105 determines a print start position of a character string considering the set distance at steps S3104 and S3105.

Next, an example operation for calculating the print start position of a character string to be printed on a tab portion of each index sheet is described with reference to FIG. 32.

Figure 32:
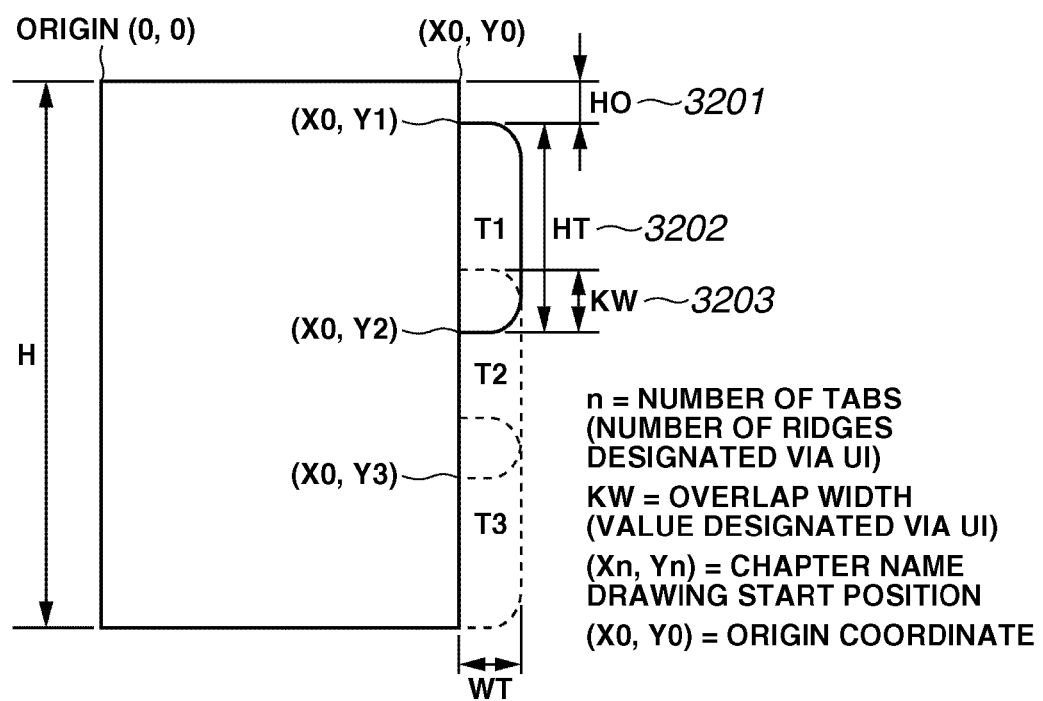
FIG. 32 illustrates print start positions of characters to be printed on tab portions of index sheets according to an exemplary embodiment of the present invention.

In FIG. 32, HO 3201 represents a value designated by the "from top" designation edit box 3001 of the tab setting window illustrated in FIG. 30. HT 3202 represents a tab height designated by the "height" designation edit box 3002 in the "tab size" designation area. Furthermore, KW 3203 represents an overlap width designated by the "overlap width" designation edit box 3006, N represents the number of tab ridges designated by the "pattern" designation area 1504, and the origin (0, 0) represents the top-left position of an index sheet Furthermore, the coordinate (X0, Y0) represents a tab start position in a case where an object index sheet has no clearance between the upper edge of the sheet and the first tab. The coordinate (X0, Y1) represents a start position of a first tab portion, and the coordinate (Xn, Yn) represents a character drawing start position on a tab of an Nth index sheet. If the tab is disposed at the right or left side of an index sheet, an Xn-value is constant for the tab of each index sheet and an Yn-value can be obtained in the following manner.

Two equations are required to obtain the Yn-value if the "uniform division layout" radio button 3004 is in an ON state (ordinary print processing). The Y-coordinate value of the first tab (i.e., top tab) is "Y1=H0", and the Y-coordinate value of the second (or succeeding) tab is "Yn+1=Yn+HT: n is an integer equal to or greater than 1".

Furthermore, if the "designate overlap width of neighboring tabs" 3005 is in an ON state, the Y-coordinate value of the first tab is "Y1=H0."

If the overlap width KW is equal to or greater than 0 (i.e., in the case where two tabs of neighboring sheets are overlapped), the Y-coordinate value of the second (or succeeding) tab is "Yn+1=(Yn+HT)−KW: n is an integer equal to or greater than 1". If the overlap width KW is less than 0 (i.e., in the case where two tabs of neighboring sheets are spaced), the Y-coordinate value of the second (or succeeding) tab is "Yn+1=(Yn+HT)+KW: n is an integer equal to or greater than 1".

In this manner, tab start positions Y1, Y2, Y3 ..., Yn of each index sheet can be successively obtained. The obtained coordinate information can be stored as index sheet information in the "index sheet information" area 805 illustrated in FIG. 21.

Through the above-described processing, the bookbinding application 104 specifies the start and end positions of each tab. Then, the bookbinding application 104 determines a print start position of a character string to be printed on a tab portion according to the character alignment set by a user via the tab text setting window illustrated in FIG. 16.

More specifically, if the "top align" is set, the bookbinding application 104 sets the print start position of a character string to Yn so that printing of the character string starts from the designated position (Yn).

If the "middle align" is set, the bookbinding application 104 determines a print start position of a character string so that a central character of the character string to be printed on a tab portion can be positioned at the center of the tab portion.

If the "bottom align" is set, the bookbinding application 104 sets the print start position of a character string to Yn+HT. Namely, the bookbinding application 104 determines a print start position so that a final character of the printing character string to be printed on a tab portion can be positioned at the lower end of the tab portion.

In this manner, the bookbinding application 104 determines a print start position of a character string relative to each tab with reference to the information set by a user. Then, the electronic original despooler 105 outputs drawing information (GDI) based on the information set by the bookbinding application 104 and the printer driver 106 generates print data based on the drawing information.

An example is described below. It is now assumed that a user's designation in the "pattern" designation area 1504 is "A4 3-ridge" (i.e., the index sheet size is A4 (210 mm×297 mm), and the number of ridges is 3) and the "HO" value in the "from top" designation edit box 3001 illustrated in FIG. 30 is 3 mm. Furthermore, the "HT" value in the "height" designation edit box 3003 of the "tab size" designation area is 30 mm, and the "KW" value in the "overlap width" designation edit box 3006 is 15 mm. And, the designated character alignment is "top align".

In this case, the coordinates of the character print start position of three tabs can be obtained in the following manner. First, the bookbinding application 104 determines a start position of each tab. The tab start position of the first index sheet is (X1, Y1). Similarly, tab start positions of the second and third index sheets are (X2, Y2) and (X3, Y3).

The X-coordinate (i.e., position in the horizontal direction) of each tab is the same. Thus, the bookbinding application 104 sets X0=X1=X2=X3. According to this example, the index sheet has an A4 size (i.e., X0=210). Furthermore, the Y-coordinate value (Y0) is the same as the origin (=0). According to this example, the "overlap width" KW is equal to or greater than 0. Y1 is "Y1=H0", and Yn (n>1: n is an integer) is "Yn+1=(Yn+HT)−KW: n is an integer equal to or greater than 1". Therefore, the bookbinding application 104 can determine that the start position of the first tab is "Y1=3". Then, the bookbinding application 104 determines the start position of the second tab "Y2=(Y1+HT)−KW={(3+30)−15}=18". Similarly, the bookbinding application 104 determines the start position of the third tab "Y3=(18+30)−15=33". As a result, according to this example, the bookbinding application 104 can set (X0, Y1)=(210, 3), (X0, Y2)=(210, 18), and (X0, Y3)=(210, 33).

After obtaining the coordinate values of each tab start position, the bookbinding application 104 determines a print start position of a character string based on the character alignment set by a user. In this example, the character alignment set by a user is "top align." Therefore, the print start position is equal to the tab start position.

In this manner, the bookbinding application 104 can perform print setting of various index sheets.

Figure 33:
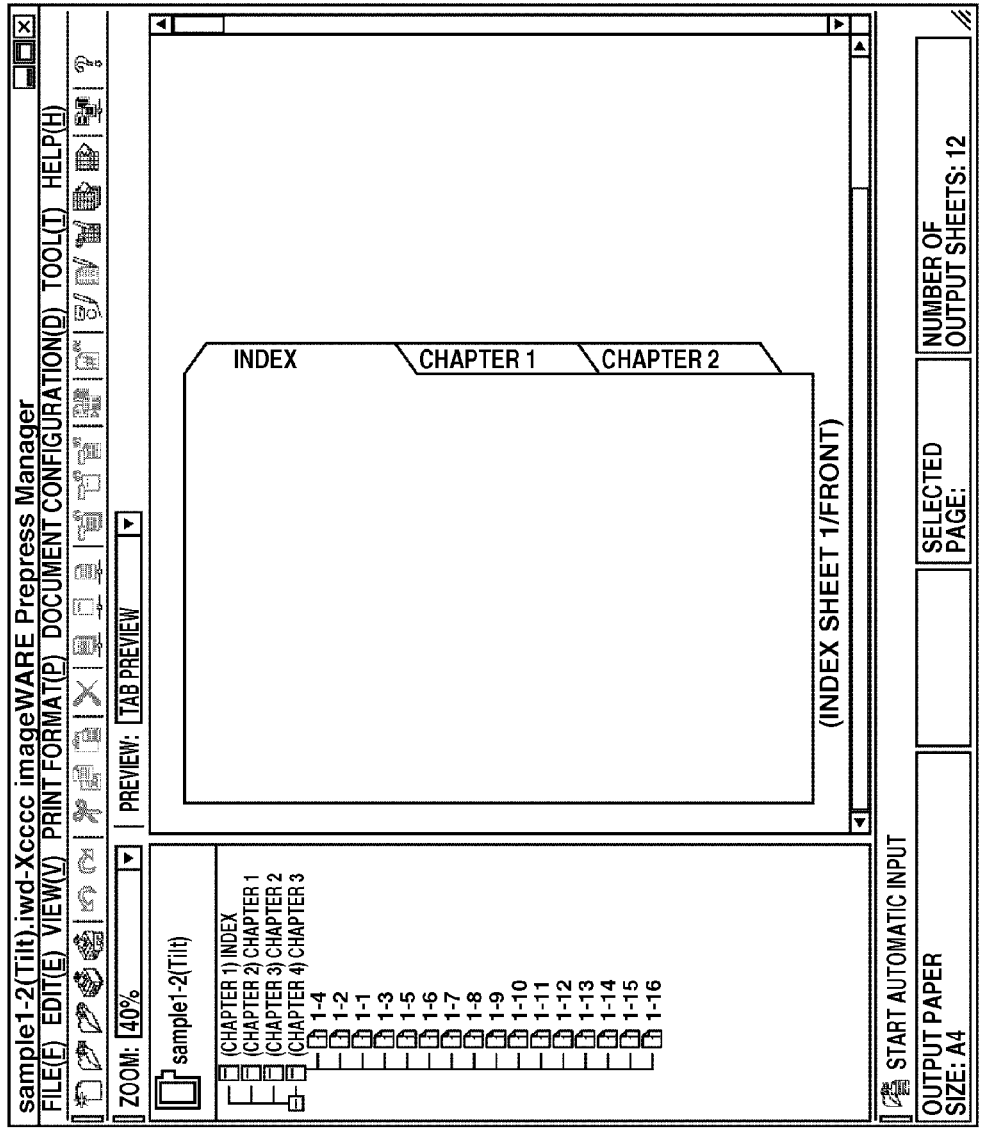
FIG. 33 illustrates an example preview display of index sheets resulting from index sheet settings and tab print settings according to an exemplary embodiment of the present invention.

FIG. 33 illustrates another method for displaying a print preview applied to the index sheets illustrated in FIG. 28.

The print preview of FIG. 33 can display each index sheet having a tab similar to FIG. 28 together with a character string set according to a user's preference (e.g., character size, character font, and character alignment). Furthermore, the print preview of FIG. 33 does not display any other pages so that all index sheets of a document can be displayed in a finished state. Thus, the print preview of FIG. 33 enables a user to easily confirm the shape of each index sheet and check whether any part of a character string printed on a tab is concealed by other tab portion, for example, when two neighboring tab portions are overlapped partly.

The bookbinding application 104 displays the preview screen illustrated in FIG. 33 if a user selects "tab preview" in a preview pattern designation area 3200.

Second Exemplary Embodiment

The above-described first exemplary embodiment has described an example tab printing technique applied to various patterns of index sheets, such as a tab layout pattern of two or more index sheets having tab portions mutually overlapped or a tab layout pattern of index sheets having tab portions mutually spaced, so that a designated character string can be printed on a tab portion.

Figure 47:
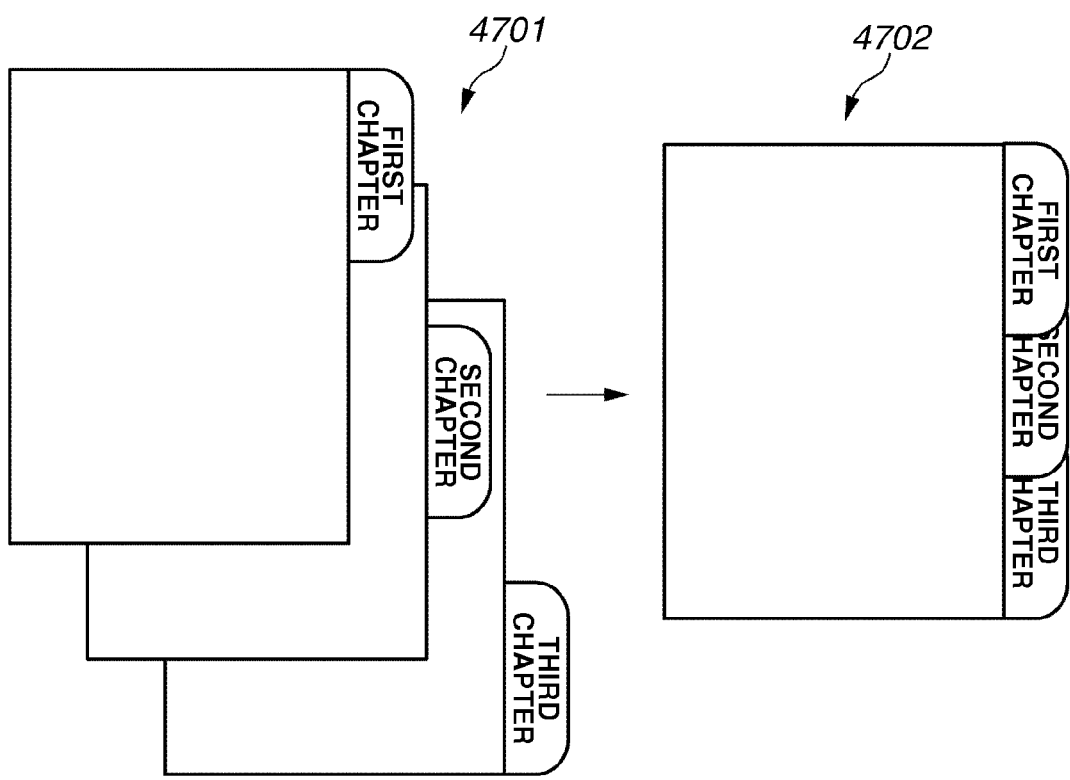
FIG. 47 illustrates example index sheets according to an exemplary embodiment of the present invention.

However, according to the first exemplary embodiment, a character string or other print contents printed on each tab may be concealed if a neighboring tab is partly overlapped on this tab. FIG. 47 illustrates example index sheets according to a second exemplary embodiment of the present invention. According to the example illustrated in FIG. 47, if three index sheets 4701 are stacked together as a set of index sheets 4702, a character string printed on a second or third tab is concealed by the first or second tab respectively.

Hence, the second exemplary embodiment provides a printing technique capable of appropriately determining a drawing start position of a character string if tabs of two or more index sheets overlap each other, so that a printed character string on a tab is not concealed by a neighboring tab.

A document processing system according to the second exemplary embodiment has a hardware configuration similar to that described in the first exemplary embodiment.

Figure 34:
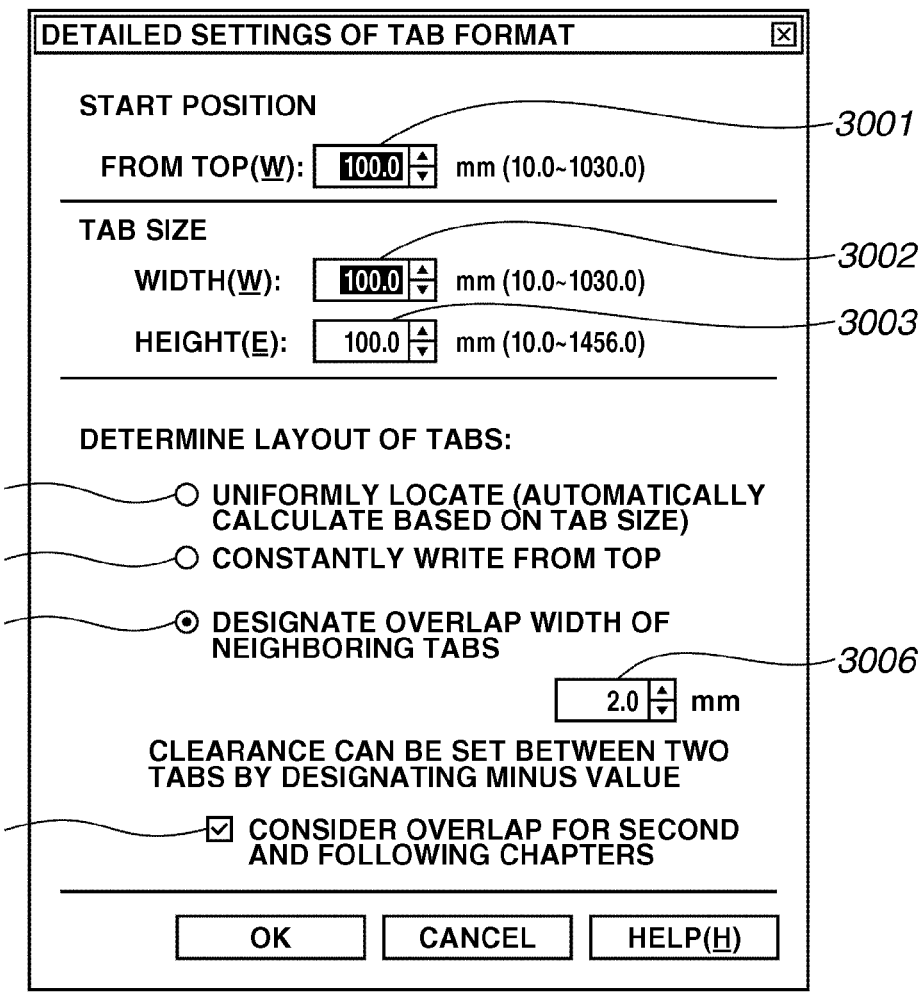
FIG. 34 illustrates an example user interface screen enabling a user to set a method for performing a print on a tab of an index sheet according to an exemplary embodiment of the present invention.

FIG. 34 illustrates an example window which enables a user to designate a tab printing method according to the second exemplary embodiment of the present invention.

FIG. 34 is an example window similar to FIG. 30 which enables a user to set a tab pattern and designate a tab portion printing method.

The window illustrated in FIG. 34 additionally includes a "consider overlap for second and following chapters" check box 3402. If a user checks the "consider overlap for second and following chapters" check box 3402, the bookbinding application 104 executes the processing of the second exemplary embodiment. A user can designate the "consider overlap for second and following chapters" check box 3402 only when the "designate overlap width of neighboring tabs" 3005 is in an ON state.

If a user checks the "consider overlap for second and following chapters" check box 3402, the bookbinding application 104 performs processing for calculating a character drawing start position so that a character string can be positioned within a tab portion and not concealed by a neighboring tab when the tabs of index sheets are overlapped with each other.

Namely, if the "consider overlap for second and following chapters" check box 3402 is in an ON state, printing of a character string starts from a designated position on a tab based on the values designated by the "width" and "height" designation edit boxes 3002 and 3003 and the value designated by the "overlap width" designation edit box 3006, so that the character string on the tab is not concealed by a neighboring tab.

Furthermore, if a user selects "constantly write from top" 3401 in a "tab layout setting" area, the bookbinding application 104 constantly designates an uppermost edge of an index sheet as a drawing start position and performs print processing. In this case, the bookbinding application 104 neglects setting contents (setting values in the "from top" designation edit box 3001, the "height" designation edit box 3003, and the "overlap width" designation edit box 3006) relating to the tab layout of an index sheet.

Figure 44:
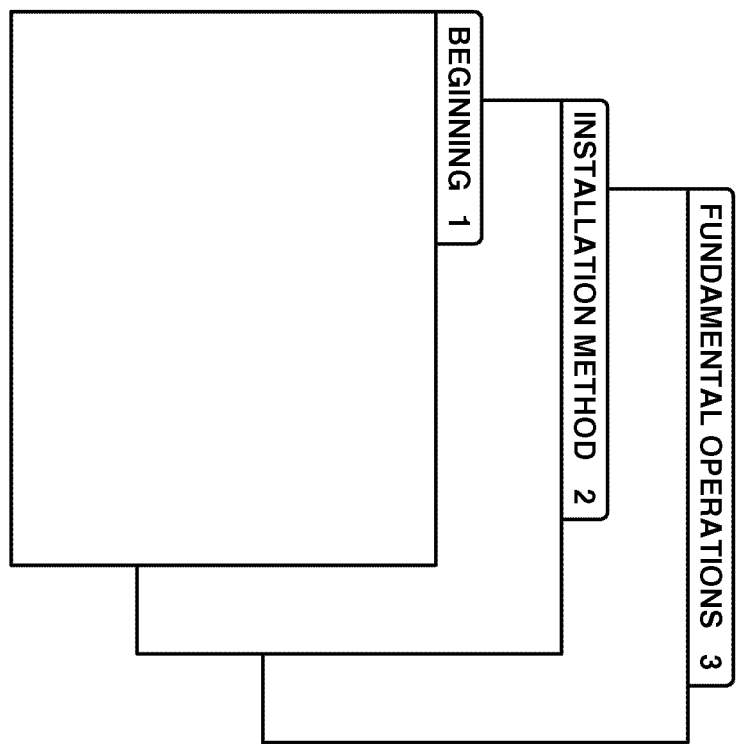
FIG. 44 illustrates example index sheets according to an exemplary embodiment of the present invention.

FIG. 44 illustrates an example printing result obtained when a user selects the "constantly write from top" 3401, according to which printing of a character string on each tab constantly starts from the uppermost edge of an index sheet.

For example, individual tabs of index sheets may be different in size as illustrated in FIG. 44. In this case, the bookbinding application 104 can determine the layout of a chapter name on each tab so that the printed name has a size comparable with the maximum region available for the printing on each tab.

Figure 35:
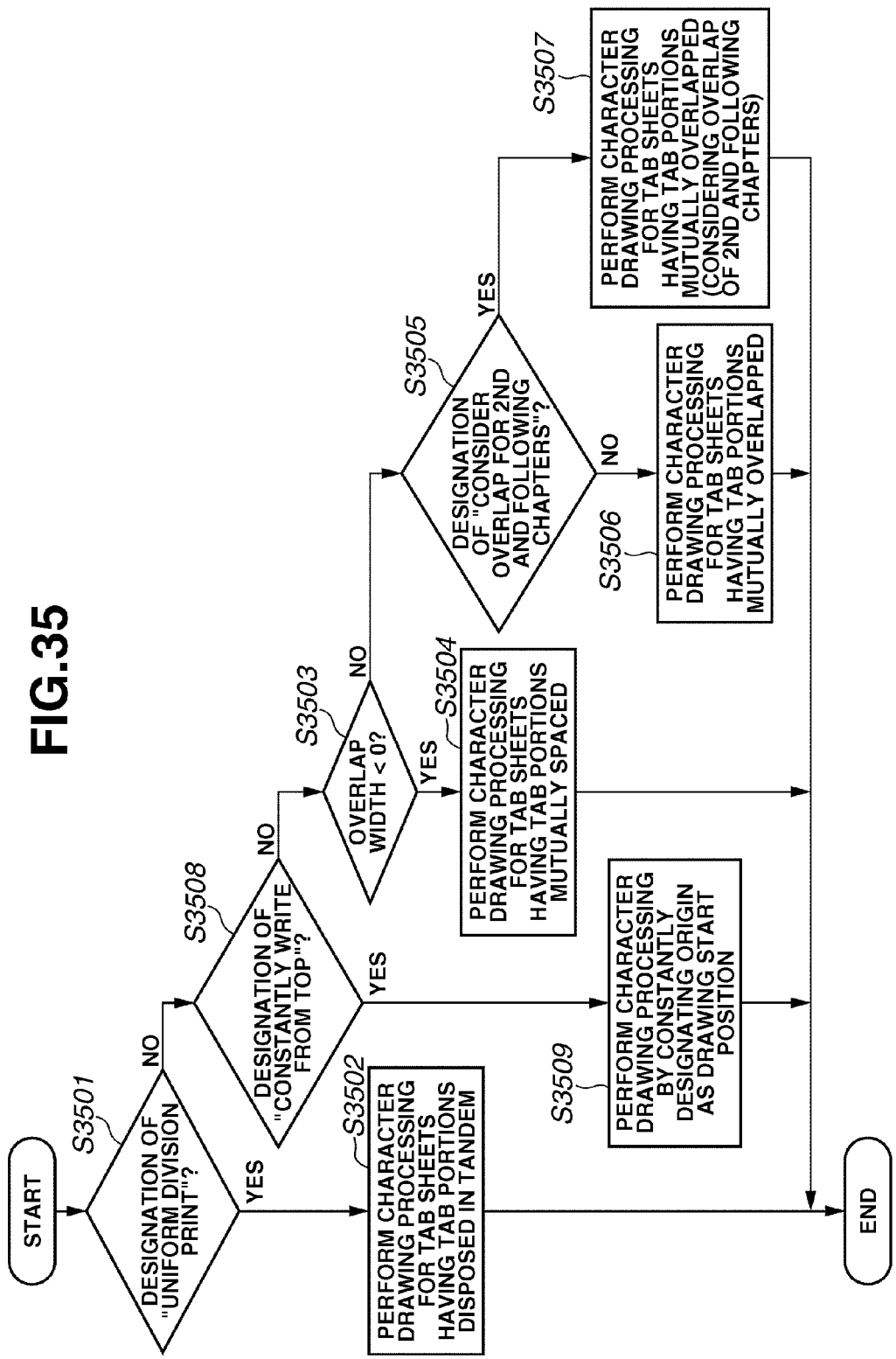
FIG. 35 is a flowchart illustrating example processing for printing index sheets according to an exemplary embodiment of the present invention.

FIG. 35 is a flowchart illustrating example tab print position adjustment processing (i.e., processing performed considering a tab pattern) according to the second exemplary embodiment. The example processing is described below with reference to FIG. 34.

At step S3501, the bookbinding application 104 determines whether the "uniform division layout" radio button 3004 is in an ON state. If the bookbinding application 104 determines that the "uniform division layout" radio button 3004 is in an ON state (YES in step S3501), the processing flow proceeds to step S3502. At step S3502, the bookbinding application 104 instructs the electronic original despooler 105 to perform ordinary tab drawing processing of step S2707 illustrated in FIG. 27.

If the bookbinding application 104 determines that the "uniform division layout" radio button 3004 is in an OFF state (NO in step S3501), the processing flow proceeds to step S3508. At step S3508, the bookbinding application 104 determines whether the "constantly write from top" button 3401 is in an ON state. If the bookbinding application 104 determines that the button 3401 is in an ON state (YES in step S3508), the processing flow proceeds to step S3509.

Figure 43:
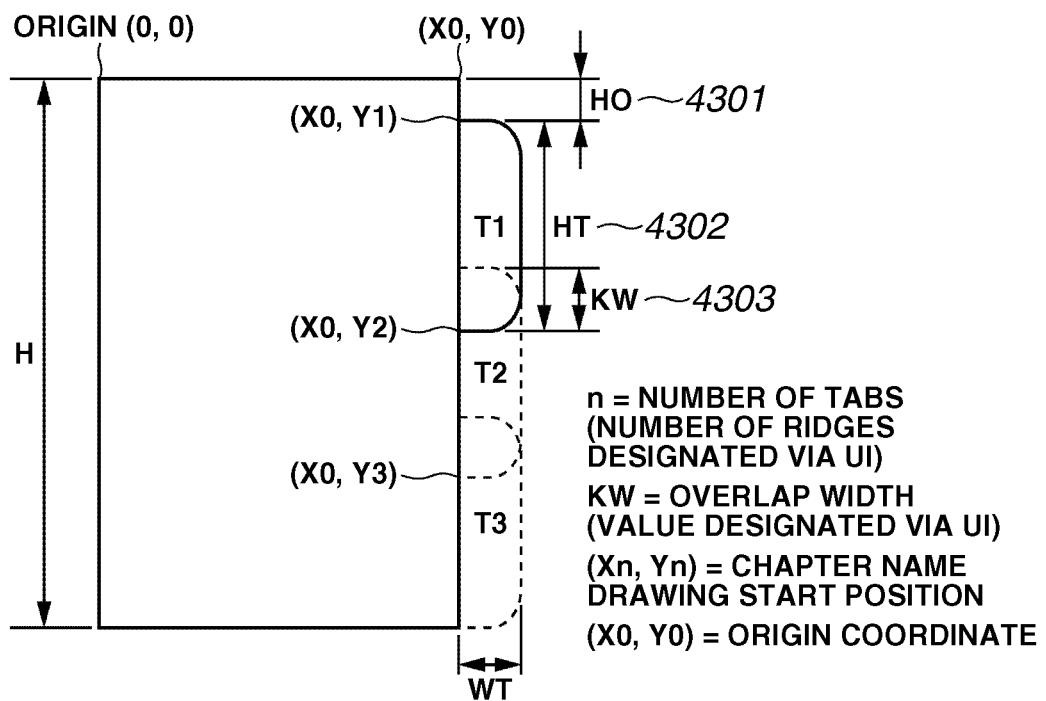
FIG. 43 illustrates print start positions of characters to be printed on tab portions of index sheets according to an exemplary embodiment of the present invention.

At step S3509, the bookbinding application 104 instructs the electronic original despooler 105 to output drawing information (GDI function) for constantly designating the uppermost edge (i.e., (X0, Y0) illustrated in FIG. 43) of a sheet as drawing start position and printing a designated character string from the designated start position.

If the bookbinding application 104 determines that the "constantly write from top" button 3401 is in an OFF state (NO in step S3508), the processing flow proceeds to step S3503. At step S3503, the bookbinding application 104 determines whether a value designated in the "overlap width" designation edit box 3006 is less than 0. If the bookbinding application 104 determines that the designated overlap width is less than 0 (YES in step S3503), the processing flow proceeds to step S3504.

At step S3504, the bookbinding application 104 instructs the electronic original despooler 105 to output drawing information so that a designated character string can be printed on a tab portion with reference to a value (i.e., a clearance between two tabs) designated in the "overlap width" designation edit box 3006.

If the bookbinding application 104 determines that the designated overlap width is equal to or greater than 0 (NO in step S3503), the processing flow proceeds to step S3505. At step S3505, the bookbinding application 104 determines whether the "consider overlap for second and following chapters" check box 3402 is in an ON state.

If the bookbinding application 104 determines that the "consider overlap for second and following chapters" check box 3402 is in an ON state (YES in step S3505), the processing flow proceeds to step S3507. At step S3507, the bookbinding application 104 instructs the electronic original despooler 105 to output drawing information (GDI function) so that a designated character string can be printed on a tab portion and not concealed by a neighboring tab with reference to the overlap width.

Namely, if the "consider overlap for second and following chapters" check box 3402 is set in an ON state by a user via the window illustrated in FIG. 34, a designated character string can be printed so as not to be concealed by a neighboring index sheet as illustrated in FIG. 47.

If the bookbinding application 104 determines that the "consider overlap for second and following chapters" check box 3402 is in an OFF state (NO in step S3505), the processing flow proceeds to step S3506. At step S3506, the bookbinding application 104 instructs the electronic original despooler 105 to perform print processing similar to the processing of step 3105 illustrated in FIG. 31. The electronic original despooler 105 outputs drawing information (GDI function) so that a designated character string can be printed on each tab.

Figure 36:
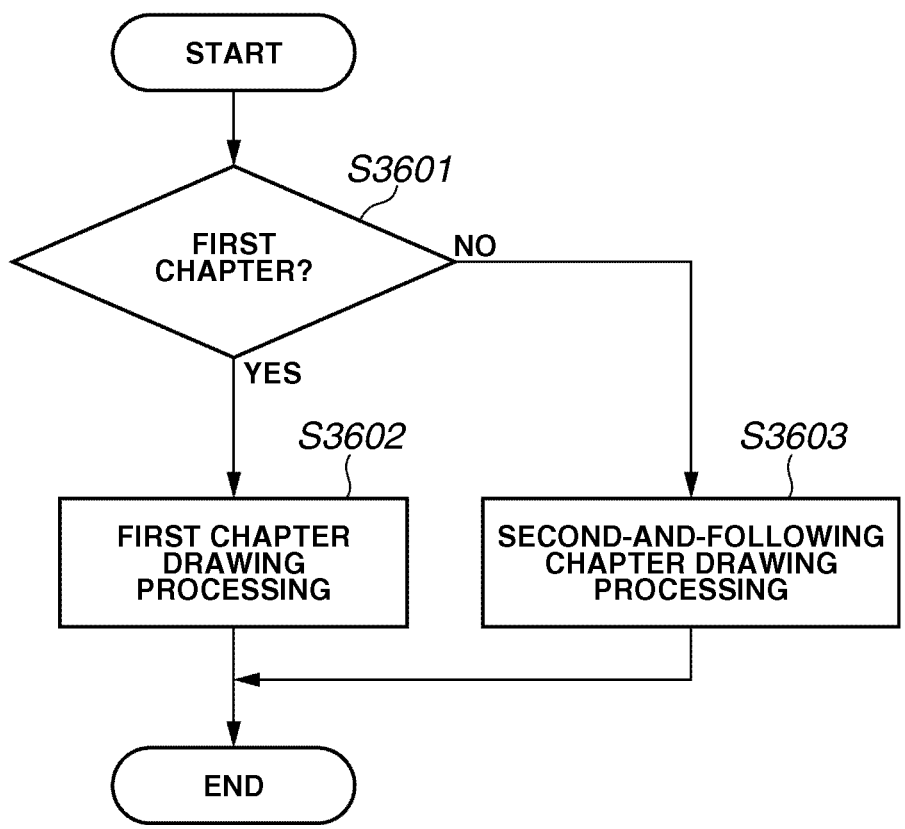
FIG. 36 is a flowchart illustrating example processing for printing index sheets according to an exemplary embodiment of the present invention.

FIG. 36 is a flowchart illustrating detailed print processing performed when the "consider overlap for second and following chapters" check box 3402 is turned on in step S3507 of the flowchart illustrated in FIG. 35.

At step S3601, the bookbinding application 104 determines whether the present tab print processing is for a first chapter. If the bookbinding application 104 determines that the present tab print processing is for the first chapter (YES in step S3601), the processing flow proceeds to step S3602. At step S3602, the bookbinding application 104 performs print processing (considering a tab overlap) for the first chapter.

If the bookbinding application 104 determines that the present tab print processing is for a second (or succeeding) chapter (NO in step S3601), the processing flow proceeds to step S3603. At step S3603, the bookbinding application 104 performs print processing (considering a tab overlap) for the second (or succeeding) chapter. Detailed processing of step S3603 is described below with reference to FIG. 43.

An example method for obtaining a print start position (coordinate values) of each chapter name on a tab portion in the tab print processing is described below with reference to FIG. 43. In this case, the "consider overlap for second and following chapters" check box 3402 is in an ON state (in step S3507).

In FIG. 43, HO 4301 represents a value designated by the "from top" designation edit box 3001 and HT 4302 represents a tab height designated by the "height" designation edit box 3002 in the "tab size" designation area. Furthermore, KW 4303 represents an overlap width designated by the "overlap width" designation edit box 3006, N represents the number of tab ridges designated by the "pattern" designation area 1504, and the origin (0, 0) represents the top-left position of an index sheet.

Furthermore, the coordinate (X0, Y0) represents a character print start position in a case where there is no clearance from the upper edge of the index sheet to the first tab. The coordinate (X0, Y1) represents a drawing region of a character string to be printed on the first tab portion obtained by the bookbinding application 104, and the coordinate (Xn, Yn) represents an Nth character. An X0-value is constant for the tab of each index sheet (i.e., X0=Xn) and an Yn-value can be obtained in the following manner.

Two equations are required to obtain the Yn-value for an index sheet of the first chapter and for an index sheet of the second (or succeeding) chapter. If an index sheet is for the first chapter, the Y-coordinate value is "Y1=HO". If an index sheet is for the second (or succeeding) chapter, the Y-coordinate value is "Yn=Yn−1+HT−KW: n is an integer equal to or greater than 2".

An example is described below. It is now assumed that an index sheet size designated in the "pattern" designation area 1504 is A4 (210 mm×297 mm) and the number of ridges is 5. The value (HO) designated in the "from top" box 3001 is 3 mm, the value (HT) designated in the "height" designation edit box 3003 is 30 mm, and the value (KW) designated in the "overlap width" designation edit box 3006 is 15 mm.

The character print start positions of three tabs (i.e., coordinate values (X1, Y1), (X2, Y2), and (X3, Y3)) can be obtained in the following manner. The X-coordinate value is the same for each tab (i.e., X0=X1=X2=X3). According to this example, the index sheet has an A4-size (i.e., X0=210) and the height of the Y0-coordinate is the same as the origin (i.e., Y0=0). Therefore, the tab start position coordinate Y1 of the first chapter is "Y1=HO=3". Furthermore, the tab start position coordinate of the second (or succeeding) chapter can be obtained from the equation "Yn=Yn−1+HT−KW: n is an integer equal to or greater than 2." Namely, "Y2={3+30−15}=18, and Y3={18+30−15}=33".

As described above, the processing of FIG. 36 and explain of FIG. 43 ([0381-0385]) can realize the print processing considering an overlap of neighboring tabs of stacked index sheets and can prevent a printed character string on a tab from being concealed.

Namely, the bookbinding application 104 determines a print start position of a character string to be printed on the second tab based on the tab position of the first tab sheet, so that the character string printed on the second tab is not concealed by a tab of the first tab sheet.

In the second exemplary embodiment, the bookbinding application 104 can perform combined setting of the "character alignment" 1605 illustrated in FIG. 17 and the "consider overlap for second and following chapters" check box 3402 illustrated in FIG. 34.

The ordinary "character alignment" 1605 is a position alignment of the entire tab portion in the up-and-down direction. However, if a user sets the "consider overlap for second and following chapters" check box 3402 to an ON state and designates the "character alignment" 1605, the position alignment in the up-and-down direction is performed for a tab portion exposed in a state where all index sheets are stacked for a bookbinding operation.

Namely, according to the example illustrated in FIG. 43, a region subjected to the "character alignment" is a region extending from Y2 to Y3 of the tab of the second index sheet. For example, if the "character alignment" selected by a user is "middle align (index tab upside)" or "middle align (index tab downside)", a central position of a character string to be printed on the second tab is set to the center of the region extending from Y2 to Y3. A method for determining a print start position performed when the character alignment is applied is similar to the method described in the first exemplary embodiment.

Figure 45:
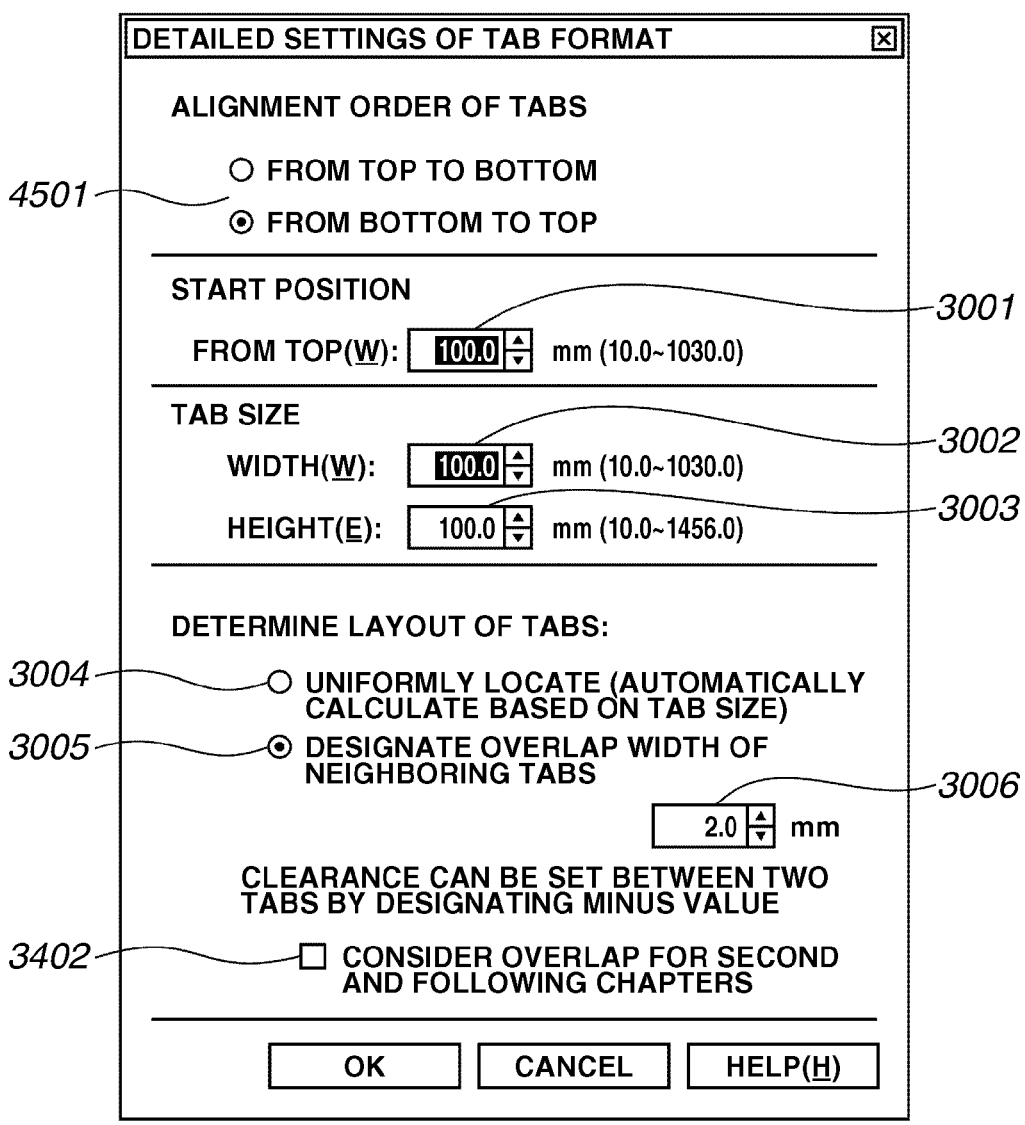
FIG. 45 illustrates an example user interface screen enabling a user to set a method for performing a print on a tab of an index sheet according to an exemplary embodiment of the present invention.

Furthermore, FIG. 45 illustrates another example window that enables a user to designate a tab printing method according to the second exemplary embodiment.

FIG. 45 is an example window similar to FIGS. 30 and 34 which enables a user to set a tab pattern and designate a tab portion printing method.

According to this example, a "from bottom to top" radio button is set to ON in an "alignment order of tabs" 4501 designation area. Thus, the printing operation starts from the lowermost tab in a direction advancing toward the uppermost tab.

Figure 46:
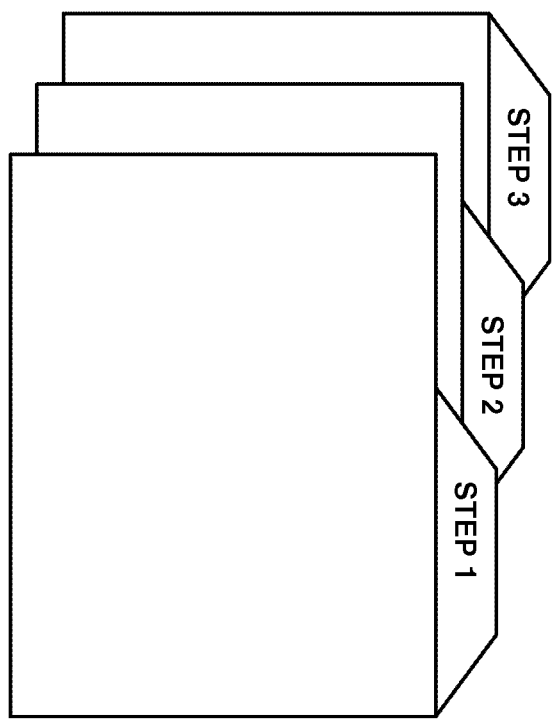
FIG. 46 illustrates example index sheets according to an exemplary embodiment of the present invention.

Namely, if three index sheets are aligned in the order illustrated in FIG. 46, the character drawing start positions are calculated so that character strings can be printed from the lowermost tab.

As described above, the second exemplary embodiment can realize accurate printing of a character string on a region designated by a user even if the tab shape of an index sheet is different from the tab shape of the next index sheet. Thus, an exemplary embodiment enables a user to easily print a character string on a tab as intended regardless of the tab shape of each insertion paper.

The present invention can be applied to a system including two or more devices (host computer, interface device, reader, printer, etc.) and also applied to a single device (copy machine, facsimile apparatus, etc.).

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. In this case, the type of program can be any one of object code, interpreter program, and OS script data.

Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

Moreover, an operating system (OS) or other application software running on a computer can execute part or the whole of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-119029 filed Apr. 27, 2007, which is hereby incorporated by reference herein in its entirety.

What is claimed is:

1. An information processing apparatus having a CPU and being operable to generate print data interpretable by a printing apparatus and to transmit the generated print data to the printing apparatus, the information processing apparatus comprising:
a first display control unit configured to display a screen including a selection option for a first alignment order of tab sheets and a selection option for a second alignment order of tab sheets, the tab sheets being tab-attached printing paper and inserted between sheets of printing paper based on the print data;
a selection unit configured to select the first alignment order or the second alignment order via the screen,
wherein the selected alignment order identifies a positional relationship of the tab portions of tab sheets in a stack of the tab sheets, the stack including at least a top tab sheet and a following tab sheet, the following tab sheet being a tab sheet below the top tab sheet, and wherein the tab portions of the tab sheets all reside along a same one side of the stack, the one side having a top end and a bottom end, such that in the first alignment order, the tab portion of the top sheet is positioned closer to the top end of the one side than the tab portion of the following sheet, and in the second alignment order the tab portion of the top sheet is positioned closer to the bottom end of the one side than the tab portion of the following sheet;
a determination unit configured to determine a print start position of a character string to be printed on the tab portion of each of the tab sheets according to the alignment order selected by the selecting unit; and
a setting unit configured to set an overlap width of the tab portion of the top tab sheet and the tab portion of the following tab sheet in a state where the top and following tab sheets are stacked,
wherein the determination unit is operable to determine the print start position of the character string to be printed on the tab portion of the following tab sheet based on the overlap width such that the character string printed on the tab portion of the following tab sheet is not concealed by the tab portion of the top tab sheet.

2. The information processing apparatus according to claim 1, further comprising:
a position setting unit configured to set an alignment position for the character string in the tab portion.

3. A method for an information processing apparatus operable to generate print data interpretable by a printing apparatus and transmit the generated print data to the printing apparatus, the method comprising:
displaying, performed by a CPU, a screen including a selection option for a first alignment order of tab sheets and a selection option for a second alignment order of tab sheets, the tab sheets being tab-attached printing paper and inserted between sheets of printing paper based on the print data;
selecting the first alignment order or the second alignment order via the screen, wherein the selected alignment order identifies a positional relationship of the tab portions of the tab sheets in a stack of tab sheets, the stack including at least a top tab sheet and a following tab sheet, the following tab sheet being a tab sheet below the top tab sheet, and wherein the tab portions of the tab sheets all reside along a same one side of the stack, the one side having a top end and a bottom end, such that in the first alignment order, the tab portion of the top sheet is positioned closer to the top end of the one side than the tab portion of the following sheet, and in the second alignment order the tab portion of the top sheet is positioned closer to the bottom end of the one side than the tab portion of the following sheet;
determining a print start position of a character string to be printed on the tab portion of each of the tab sheets according to the alignment order selected; and
setting an overlap width of the tab portion of the top tab sheet and the tab portion of the following tab sheet in a state where the top and following tab sheets are stacked,
wherein, the print start position of the character string to be printed on the tab portion of the following tab sheet, determined in the determining step, is based on the sheet is not concealed by the tab portion of the top tab sheet.

4. A method according to claim 3, further comprising:
setting an alignment position for the character string in the tab portion.

5. A non-transitory computer-readable storage medium storing a computer-executable program that cause an information processing apparatus to generate print data interpretable by a printing apparatus and transmitting the generated print data to the printing apparatus, the program comprising:
displaying a screen including a selection option for a first alignment order of tab sheets and a selection option for a second alignment order of tab sheets, the tab sheets being tab-attached printing paper and inserted between sheets of printing paper based on the print data;
selecting the first alignment order or the second alignment order via the screen,
wherein the selected alignment order identifies a positional relationship of the tab portions of tab sheets in a stack of tab sheets, the stack including at least a top tab sheet and a following tab sheet, the following tab sheet being a tab sheet below the top tab sheet, and wherein the tab portions of the tab sheets all reside along a same one side of the stack, the one side having a top end and a bottom end, such that in the first alignment order, the tab portion of the top sheet is positioned closer to the top end of the one side than the tab portion of the following sheet, and in the second alignment order the tab portion of the top sheet is positioned closer to the bottom end of the one side than the tab portion of the following sheet; a
determining a print start position of a character string to be printed on the tab portion of each of the tab sheets according to the alignment order; and
setting an overlap width of the tab portion of the top tab sheet and the tab portion of the following tab sheet in a state where the top and following tab sheets are stacked,
wherein, the print start position of the character string to be printed on the tab portion of the following tab sheet, determined in the determining step, is based on the overlap width such that the character string printed on the tab portion of the following tab sheet is not concealed by the tab portion of the top tab sheet.

6. A storage medium storing a computer-executable program according to claim 5, further comprising:
setting an alignment position for the character string in the tab portion.

* * * * *